(12) United States Patent
Hofmann et al.

(10) Patent No.: US 11,920,668 B2
(45) Date of Patent: Mar. 5, 2024

(54) SYSTEMS AND METHODS FOR IMPLEMENTING BULK METALLIC GLASS-BASED MACROSCALE GEARS

(71) Applicant: California Institute of Technology, Pasadena, CA (US)

(72) Inventors: Douglas C Hofmann, Altadena, CA (US); Andrew Kennett, Montrose, CA (US); Kobie T. Boykins, Sunland, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/193,573

(22) Filed: Mar. 5, 2021

(65) Prior Publication Data

US 2021/0254699 A1    Aug. 19, 2021

Related U.S. Application Data

(63) Continuation of application No. 16/259,772, filed on Jan. 28, 2019, now Pat. No. 10,941,847, which is a
(Continued)

(51) Int. Cl.
*F16H 55/06* (2006.01)
*C22C 1/02* (2006.01)
(Continued)

(52) U.S. Cl.
CPC ............... *F16H 55/06* (2013.01); *C22C 1/02* (2013.01); *C22C 14/00* (2013.01); *C22C 30/00* (2013.01);
(Continued)

(58) Field of Classification Search
CPC .......... C22C 1/02; C22C 14/00; C22C 30/00; C22C 45/10; F16H 55/06; Y10T 29/49462; Y10T 74/19
See application file for complete search history.

(56) References Cited

U.S. PATENT DOCUMENTS 2,931,249 A    4/1960    Walton
3,119,283 A    1/1964    Itzhak
(Continued)

FOREIGN PATENT DOCUMENTS

CN    101709773 A    5/2010
CN    102563006 A    7/2012
(Continued)

OTHER PUBLICATIONS

Cryogenic Charpy impact testing of metallic glass matrix composites (Year: 2011).*
(Continued)

*Primary Examiner* — Jenny R Wu

(57) ABSTRACT

Systems and methods in accordance with embodiments of the invention implement bulk metallic glass-based macroscale gears. In one embodiment, a method of fabricating a bulk metallic glass-based macroscale gear, where at least either the thickness of the gear is greater than 3 mm or the diameter of the gear is greater than 9 mm, includes: obtaining design parameters of the gear to be formed; selecting a bulk metallic glass from which the gear will be formed based on the obtained design parameters, where the selected bulk metallic glass is characterized by a resistance to standard modes of wear and a resistance to brittle fracture such that a gear can be formed from the selected bulk metallic glass that accords with the obtained design parameters; and fabricating the gear from the selected bulk metallic glass that accords with the obtained design parameters.

20 Claims, 15 Drawing Sheets

Related U.S. Application Data continuation of application No. 13/928,109, filed on Jun. 26, 2013, now abandoned.

(60) Provisional application No. 61/664,620, filed on Jun. 26, 2012.

(51) Int. Cl.
- C22C 14/00 (2006.01)
- C22C 30/00 (2006.01)
- C22C 45/10 (2006.01)

(52) U.S. Cl.
CPC ......... C22C 45/10 (2013.01); *Y10T 29/49462* (2015.01); *Y10T 74/19* (2015.01)

(56) References Cited

U.S. PATENT DOCUMENTS

| | | |
|---|---|---|
| 3,435,512 A | 4/1969 | Macrobbie |
| 3,519,444 A | 7/1970 | Brown et al. |
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk et al. |
| 4,173,393 A | 11/1979 | Maurer |
| 4,202,404 A | 5/1980 | Carlson |
| 4,584,036 A | 4/1986 | Taub et al. |
| 4,670,636 A | 6/1987 | Taub et al. |
| 4,711,795 A | 12/1987 | Takeuchi et al. |
| 4,749,625 A | 6/1988 | Obayashi et al. |
| 4,783,983 A | 11/1988 | Narasimhan |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,002,798 A * | 3/1991 | Donley .............. C10M 103/06 427/255.31 |
| 5,005,456 A | 4/1991 | Ballard et al. |
| 5,168,918 A | 12/1992 | Okuda et al. |
| 5,185,198 A | 2/1993 | Lefeber et al. |
| 5,288,344 A | 2/1994 | Peker et al. |
| 5,310,432 A | 5/1994 | Yamanaka et al. |
| 5,417,385 A | 5/1995 | Arnold et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,325,087 B1 | 12/2001 | Tarr |
| 6,620,264 B2 | 9/2003 | Kundig et al. |
| 6,652,679 B1 | 11/2003 | Inoue et al. |
| 6,732,606 B1 | 5/2004 | Zhu et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,323,071 B1 | 1/2008 | Branagan |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,496,077 B2 | 7/2013 | Nesnas et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,044,805 B2 | 6/2015 | Prest et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,579,718 B2 | 2/2017 | Hofmann |
| 9,610,650 B2 | 4/2017 | Hofmann et al. |
| 9,689,231 B2 | 6/2017 | Fripp et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 10,471,652 B2 | 11/2019 | Hofmann et al. |
| 10,487,934 B2 | 11/2019 | Kennett et al. |
| 10,690,227 B2 | 6/2020 | Hofmann et al. |
| 10,883,528 B2 | 1/2021 | Hofmann et al. |
| 10,941,847 B2 | 3/2021 | Hofmann et al. |
| 10,953,688 B2 | 3/2021 | Parness et al. |
| 10,968,527 B2 | 4/2021 | Hofmann et al. |
| 11,155,907 B2 | 10/2021 | Hofmann et al. |
| 11,168,776 B2 | 11/2021 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0052105 A1 | 3/2003 | Nagano et al. |
| 2003/0062811 A1 | 4/2003 | Peker et al. |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0211340 A1 | 9/2005 | Kim et al. |
| 2005/0263932 A1 | 12/2005 | Heugel |
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0039689 A1 | 2/2007 | Petersson et al. |
| 2007/0144621 A1 | 6/2007 | Farmer et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2007/0270942 A1 | 11/2007 | Thomas |
| 2008/0085368 A1 | 4/2008 | Gauthier et al. |
| 2008/0099175 A1 | 5/2008 | Chu et al. |
| 2008/0121316 A1* | 5/2008 | Duan ...................... C22F 1/16 148/403 |
| 2008/0190521 A1 | 8/2008 | Loffler et al. |
| 2008/0304975 A1 | 12/2008 | Clark et al. |
| 2009/0011846 A1 | 1/2009 | Scott |
| 2009/0078370 A1 | 3/2009 | Sklyarevich et al. |
| 2009/0114317 A1 | 5/2009 | Collier et al. |
| 2009/0194205 A1 | 8/2009 | Loffler et al. |
| 2009/0246398 A1 | 10/2009 | Kurahashi et al. |
| 2009/0263582 A1 | 10/2009 | Batchelder |
| 2009/0277540 A1 | 11/2009 | Langlet |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |

(56) References Cited

U.S. PATENT DOCUMENTS

| | | |
|---|---|---|
| 2011/0302783 A1 | 12/2011 | Nagata et al. |
| 2012/0006085 A1 | 1/2012 | Johnson et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0132631 A1 | 5/2012 | Wescott et al. |
| 2012/0133080 A1 | 5/2012 | Moussa et al. |
| 2012/0289946 A1 | 11/2012 | Steger |
| 2013/0009338 A1 | 1/2013 | Mayer |
| 2013/0048152 A1 | 2/2013 | Na et al. |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1* | 5/2013 | Kim .................. C22C 14/00 148/403 |
| 2013/0139964 A1 | 6/2013 | Hofmann et al. |
| 2013/0143060 A1 | 6/2013 | Jacobsen et al. |
| 2013/0255837 A1 | 10/2013 | Peker et al. |
| 2013/0277891 A1 | 10/2013 | Teulet |
| 2013/0280547 A1 | 10/2013 | Brandl et al. |
| 2013/0309121 A1 | 11/2013 | Prest et al. |
| 2013/0316867 A1 | 11/2013 | Kobayashi |
| 2013/0316868 A1 | 11/2013 | Kobayashi |
| 2013/0333814 A1* | 12/2013 | Fleury .................. B22D 18/02 148/403 |
| 2014/0004352 A1 | 1/2014 | McCrea et al. |
| 2014/0010968 A1 | 1/2014 | Prest et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1 | 7/2014 | Hofmann |
| 2014/0203622 A1 | 7/2014 | Yamamoto et al. |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann et al. |
| 2014/0293384 A1 | 10/2014 | O'keeffe et al. |
| 2014/0312098 A1 | 10/2014 | Hofmann et al. |
| 2014/0332120 A1 | 11/2014 | Liu et al. |
| 2014/0334106 A1 | 11/2014 | Prest et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0044084 A1 | 2/2015 | Hofmann et al. |
| 2015/0045924 A1 | 2/2015 | Cluckers et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0158067 A1 | 6/2015 | Kumar et al. |
| 2015/0165693 A1 | 6/2015 | Sagoo et al. |
| 2015/0183169 A1 | 7/2015 | Ehsani |
| 2015/0209094 A1 | 7/2015 | Anderson |
| 2015/0209889 A1 | 7/2015 | Peters et al. |
| 2015/0219572 A1 | 8/2015 | Beuth, Jr. et al. |
| 2015/0284035 A1 | 10/2015 | Reese |
| 2015/0289605 A1 | 10/2015 | Prest et al. |
| 2015/0298443 A1 | 10/2015 | Hundley et al. |
| 2015/0299825 A1 | 10/2015 | Poole et al. |
| 2015/0314566 A1 | 11/2015 | Mattlin et al. |
| 2015/0323053 A1 | 11/2015 | El-Wardany et al. |
| 2015/0352794 A1 | 12/2015 | Nguyen et al. |
| 2016/0023438 A1 | 1/2016 | Johnson et al. |
| 2016/0175929 A1 | 6/2016 | Colin et al. |
| 2016/0178047 A1 | 6/2016 | Kennett et al. |
| 2016/0186850 A1 | 6/2016 | Hofmann et al. |
| 2016/0233089 A1 | 8/2016 | Zenou et al. |
| 2016/0242877 A1 | 8/2016 | Bernhard |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361765 A1 | 12/2016 | Danger et al. |
| 2016/0361897 A1 | 12/2016 | Hofmann et al. |
| 2017/0021417 A1 | 1/2017 | Martin et al. |
| 2017/0050241 A1 | 2/2017 | Thomas et al. |
| 2017/0121799 A1 | 5/2017 | Hofmann et al. |
| 2017/0137955 A1 | 5/2017 | Hofmann et al. |
| 2017/0144225 A1 | 5/2017 | Hofmann |
| 2017/0211168 A1 | 7/2017 | Liu et al. |
| 2017/0226619 A1 | 8/2017 | Hofmann et al. |
| 2017/0276225 A1 | 9/2017 | Takehana et al. |
| 2017/0321790 A1 | 11/2017 | Klassen et al. |
| 2018/0119259 A1 | 5/2018 | Hofmann et al. |
| 2018/0257141 A1 | 9/2018 | Hofmann et al. |
| 2018/0272432 A1 | 9/2018 | Jonsson et al. |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0009464 A1 | 1/2019 | Steege |
| 2019/0022923 A1 | 1/2019 | Hofmann et al. |
| 2019/0037721 A1 | 1/2019 | Curran et al. |
| 2019/0126674 A1 | 5/2019 | Parness et al. |
| 2019/0154130 A1 | 5/2019 | Hofmann et al. |
| 2019/0170235 A1 | 6/2019 | Hofmann et al. |
| 2019/0177826 A1 | 6/2019 | Hofmann et al. |
| 2019/0195269 A1 | 6/2019 | Hofmann et al. |
| 2019/0255635 A1 | 8/2019 | HÄnni et al. |
| 2019/0314903 A1 | 10/2019 | Haenle et al. |
| 2020/0000595 A1 | 1/2020 | Jones et al. |
| 2020/0278016 A1 | 9/2020 | Hofmann et al. |
| 2020/0278017 A1 | 9/2020 | Hofmann et al. |
| 2020/0282582 A1 | 9/2020 | Hofmann et al. |
| 2020/0284146 A1 | 9/2020 | Hofmann et al. |
| 2020/0318721 A1 | 10/2020 | Hofmann et al. |
| 2020/0406579 A1 | 12/2020 | Hahnlen |
| 2021/0207281 A1 | 7/2021 | Hofmann et al. |

FOREIGN PATENT DOCUMENTS

| | | |
|---|---|---|
| CN | 103153502 A | 6/2013 |
| CN | 203227820 U | 10/2013 |
| DE | 102005014972 A1 | 10/2006 |
| DE | 102010062089 A1 | 5/2012 |
| DE | 112018001284 T5 | 11/2019 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 3630392 A1 | 4/2020 |
| EP | 3630395 A1 | 4/2020 |
| EP | 3630397 A2 | 4/2020 |
| EP | 3129677 B1 | 9/2021 |
| JP | 60116775 A | 6/1985 |
| JP | 61276762 A | 12/1986 |
| JP | 62227070 A | 10/1987 |
| JP | 09121094 A | 5/1997 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 5249932 B2 | 7/2013 |
| JP | 2013238278 A | 11/2013 |
| JP | 2013544648 A | 12/2013 |
| JP | 2018149655 A | 9/2018 |
| KR | 101420176 B1 | 7/2014 |
| KR | 1020190119154 A | 10/2019 |
| KR | 10-2020-0004435 A | 1/2020 |

(56) References Cited

FOREIGN PATENT DOCUMENTS

| | | |
|---|---|---|
| KR | 1020200011470 A | 2/2020 |
| WO | 2005077560 A1 | 8/2005 |
| WO | 2006073428 A2 | 7/2006 |
| WO | 2007038882 A1 | 4/2007 |
| WO | 2008058896 A1 | 5/2008 |
| WO | 2008156889 A2 | 12/2008 |
| WO | 2009069716 A1 | 6/2009 |
| WO | 2010027317 A1 | 3/2010 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Dry sliding tribological behavior of Zr-based bulk metallic glass (Year: 2012).*
Effect of minor alloying additions on glass formation in bulk metallic glasses C.T. Liu (Year: 2006).*
Enhancement of plasticity in Ti-rich Ti—Zr-Be—Cu—Ni bulk metallic glasses Park, Chang, Han, Kim (Year: 2005).*
Lee et al., "Crystallization-Induced Plasticity of Cu—Zr Containing Bulk Amorphous Alloys", Acta Materialia, 2006, vol. 54, pp. 349-355.
Extended European Search Report for European Application No. 14889035.3, Search completed Dec. 4, 2017, dated Dec. 13, 2017, 10 pgs.
Extended European Search Report for European Application No. 18806700.3, Search completed Oct. 20, 2020, dated Oct. 28, 2020, 7 pgs.
Extended European Search Report for European Application No. 18809486.6, Search completed Sep. 30, 2030, dated Oct. 12, 2020, 7 pgs.
International Preliminary Report on Patentability for International Application PCT/US2018/035813, Report dated Dec. 3, 2019, dated Dec. 12, 2019, 9 pgs.
International Preliminary Report on Patentability for International Application PCT/US2013/047950, dated Dec. 31, 2014, dated Jan. 8, 2015, 7 pgs.
International Preliminary Report on Patentability for International Application PCT/US2013/050614, datedJan. 20, 2015, datedJan. 29, 2015, 9 pgs.
International Preliminary Report on Patentability for International Application PCT/US2014/033510, dated Oct. 12, 2016, dated Oct. 20, 2016, 9 pgs.
International Preliminary Report on Patentability for International Application PCT/US2014/056615, dated Mar. 22, 2016, dated Mar. 31, 2016, 11 pgs.
International Preliminary Report on Patentability for International Application PCT/US2018/022020, Report dated Sep. 10, 2019, dated Sep. 19, 2019, 10 pgs.
International Preliminary Report on Patentability for International Application PCT/US2018/034481, Report dated Nov. 26, 2019, dated Dec. 5, 2019, 17 pgs.
International Preliminary Report on Patentability for International Application PCT/US2018/034924, Report dated Nov. 26, 2019, dated Dec. 5, 2019, 13 pgs.
International Search Report and Written Opinion for International Application No. PCT/US2013/050614, Completed May 7, 2014, dated May 7, 2014, 12 pgs.
International Search Report and Written Opinion for International Application No. PCT/US2018/022020, Search completed Jul. 2, 2018, dated Jul. 3, 2018, 12 pgs.
International Search Report and Written Opinion for International Application No. PCT/US2018/034481, Search completed Sep. 10, 2018, dated Sep. 10, 2018, 19 pgs.
International Search Report and Written Opinion for International Application No. PCT/US2018/034924, Search completed Sep. 18, 2018, dated Sep. 19, 2018, 15 pgs.
International Search Report and Written Opinion for International Application No. PCT/US2018/035813, Search completed Dec. 12, 2018, dated Dec. 12, 2018, 11 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 pgs.
International Search Report and Written Opinion for International Application PCT/US2014/056615, completed Dec. 29, 2014, dated Dec. 30, 2014, 13 pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wikipedia. https://en.wikipedia.org/wiki/Group_4_element. Published Jun. 11, 2010. Accessed Aug. 24, 2016.
"Harmonic Drive", Wikipedia, printed Feb. 20. 2014, 4 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4, DOI: 10.1103/PhysRevLett.15.125503.
Abrosimova et al., "Crystalline layer on the surface of Zr-based bulk metallic glasses", Journal of Non-Crystalline solids, Mar. 6, 2001, vol. 288, pp. 121-126.
Adharapurapu et al., "Fracture of Ti—Al3Ti metal-intermetallic laminate composites: Effects of lamination on resistance-curve behavior", Metallurgical and Materials Transactions A, Nov. 2005, vol. 36A, 3217-3236.
An et al., "Synthesis of Single-Component Metallic Glasses by Thermal Spray of Nanodroplets on Amorphous Substrates", Applied Physics Letters, Jan. 26, 2012, vol. 100, pp. 041909-1-041909-4, doi:10.1063/1.3675909.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326, doi: 10.1016/j.scriptamat.2005.09.051.
Bakkal, "Sliding tribological characteristics of Zr-based bulk metallic glass under lubricated conditions", Intermetallics, Mar. 19, 2010, vol. 18, pp. 1251-1253, doi:10.1016/j.intermet.2010.02.003.
Bardt et al., "Micromolding three-dimensional amorphous metal structures", J. Mater. Res, Feb. 2007, vol. 22, No. 2, pp. 339-343, DOI:10.1557/JMR.2007.0035.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631, doi:10.1016/j.surfcoat.2007.09.028.
Berger, "A Survey of Additive Manufacturing Processes Applied on the Fabrication of Gears", 1st International Conference on Progress

(56) References Cited

OTHER PUBLICATIONS in Additive Manufacturing (Pro-AM 2014), May 26-28, 2014, pp. 315-320, doi: 10.3850/978-981-09-0446-3_010.
Boopathy et al., "Near-threshold fatigue crack growth in bulk metallic glass composites", J. Mater. Res., vol. 24, No. 12, pp. 3611-3619, Dec. 2009, DOI: 10.1557/fmr.2009.0439.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317, https://doi.org/10.1016/j.addma.2018.03.023.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs.
Byrne et al., "Bulk Metallic Glasses", Science, Jul. 25, 2008, vol. 321, pp. 502-503, doi:10.1126/science.1158864.
Cadney et al., "Cold Gas Dynamic Spraying as a Method for Freeforming and Joining Materials", Science Direct, Surface & Coatings Technology, Mar. 15, 2008, vol. 202, pp. 2801-2806, available online Oct. 17, 2007, doi: 10.1016/j.surfcoat.2007.10.010.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652, DOI: 10.1157/jmr.2011.278.
Cheng et al., "Characterization of Mechanical Properties of Fecrbsimnnby Metallic Glass Coatings", J Mater Sci., Apr. 16, 2009, vol. 44, pp. 3356-3363, DOI: 10.1007/s10853-009-3436-5.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430, doi:10.1016/j.intermet.2010.08.040.
Cheung et al., "Thermal and mechanical properties of Cu—Zr—Al bulk metallic glasses", Journal of Alloys and Compounds 434-435 (2007) 71-74.
Choi et al., "Tribological behavior of the kinetic sprayed Ni59Ti16Zr20Si2Sn3 bulk metallic glass", Journal of Alloys and Compounds, May 31, 2007, vol. 434-435, pp. 64-67, doi:10.1016/j.jallcom.2006.08.283.
Conner et al., "Shear band spacing under bending of Zr-based metallic glass plates", Acta Materialia, Jan. 27, 2004, vol. 52, pp. 2429-2434, doi: 10.1016/j.actamat.2004.01.034.
Conner et al., "Shear bands and cracking of metallic glass plates in bending", Journal of Applied Physics, Jul. 15, 2003, vol. 94, No. 2, pp. 904-911, DOI: 10.1063/1.1582555.
Dai et al., "A new centimeter-diameter Cu-based bulk metallic glass", Scripta Materialia, Jan. 20, 2006, vol. 54, pp. 1403-1408, doi:10.1016/j.scriptamat.2005.11.077.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566, DOI: 10.1557/JMR.2004.0332.
Davis, "Gear Materials, Properties, and Manufacture", ASM International 2005 Chapters 1-3 pp. 1-76.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs., DOI: 10.1103/Physics.5.100.
Demetriou et al., "Glassy steel optimized for glass-forming ability and toughness", Applied Physics Letters, Jul. 31, 2009, vol. 95; pp. 041907-1-041907-3; http://idx.doi.org/10.1063/1.3184792.
Demetriou et al., "Glassy Steel Optimized for Glass-Forming ability and toughness", Applied Physics Letters 95, 041907, DOI: 10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468, doi:10.1016/h,scriptamat.2007.10.040.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78, doi:10.1016/j.jallcom.2012.02.104.
Fan et al., "Metallic glass matrix composite with precipitated ductile reinforcement", Applied Physics Letters, Aug. 5, 2002, vol. 81, Issue 6, pp. 1020-1022, DOI: 10.1063/1.1498864.
Fleury et al., "Tribological properties of bulk metallic glasses", Materials Science and Engineering, Jul. 2004, vol. A375-377, pp. 276-279, doi:10.1016/j.msea.2003.10.065.
Fornell et al., "Enhanced mechanical properties and in vitro corrosion behavior of amorphous and devitrified Ti40Zr10Cu38Pd12 metallic glass", Journal of the Mechanical Behavior of Biomedical Materials, May 27, 2011, vol. 4, pp. 1709-1717, doi:10.1016/j.jmbbm.2011.05.028.
Fu et al., "Sliding behavior of metallic glass Part I. Experimental investigations", Wear, Oct. 2001, vol. 250, pp. 409-419.
Ganesan et al., "Bonding Behavior Studies of Cold Sprayed Copper Coating on the PVC Polymer Substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3, http://dx.doi.org/10.1063/1.47699997.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112, DOI: 10.1179/095066001225001067.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476, DOI: 10.1007/s11661-013-1968-4.
Guo et al., "Tensile ductility and necking of metallic glass", Nature Materials, Oct. 2007, vol. 6, pp. 735-739, published online Aug. 19, 2007, doi:10.1038/nmat1984.
Ha et al., "Tensile deformation behavior of two Ti-based amorphous matrix composites containing ductile β dendrites", Materials Science and Engineering: A, May 28, 2012, vol. 552, pp. 404-409, http://dx.doi.org/10.1016/j.msea.2012.05.061.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4, DOI: 10.1103/PhysRevLett.99.135502.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836, doi:10.1016/jactamat.2009.11.025.
Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.

(56) References Cited

OTHER PUBLICATIONS

Hejwowski et al., "A Comparative Study of Electrochemical Properties of Metallic Glasses and Weld Overlay Coatings", Vacuum, Feb. 2013, vol. 88, pp. 118-123, doi:10.1016/j.vacuum.2012.02.031.
Hofmann, "Bulk Metallic Glasses and Their Composites: A Brief History of Diverging Fields", Journal of Materials, Jan. 2013, vol. 2013, 7 pgs., http://dx.doi.org/10.1155/2013/517904.
Hofmann, "Shape Memory Bulk Metallic Glass Composites", Science, Sep. 10, 2010, vol. 329, pp. 1294-1295, doi:10.1126/science.1193522.
Hofmann et al., "Designing metallic glass matrix composites with high toughness and tensile ductility", Nature Letters, Feb. 28, 2008, vol. 451, pp. 1085-1090, doi:10.1038/nature06598.
Hofmann et al., "Development of tough, low-density titanium-based bulk metallic glass matrix composites with tensile ductility", PNAS, Dec. 23, 2008, vol. 105, pp. 20136-20140, www.phas.orgdgidoi/10.1073/pnas.0809000106.
Hofmann et al., "Improving Ductility in Nanostructured Materials and Metallic Glasses: Three Laws", Material Science Forum, 2010, vols. 633-634, pp. 657-663, published online Nov. 19, 2009, doi:10.4028/www.scientific.net/MSF.633-634.657.
Hofmann et al., "Semi-solid Induction Forging of Metallic Glass Matrix Composites", JOM, Dec. 2009, vol. 61, No. 12, pp. 11-17, plus cover.
Hong et al., "Microstructural Characteristics of High-Velocity Oxygen-Fuel (HVOF) Sprayed Nickel-Based Alloy Coating", Journal of Alloys and Compounds, Jul. 26, 2013, vol. 581, pp. 398-403, http://dx.doi.org/10.1016/j.jallcom.2013.07.109.
Hu et al., "Crystallization Kinetics of the $Cu_{47.5}Zr_{74.5}Al_5$ Bulk Metallic Glass under Continuous and Iso-thermal heating", Applied Mechanics and Materials, Sep. 8, 2011, vols. 99-100, pp. 1052-1058, doi:10.4028/www.scientific.net/AMM.99-100.1052.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97, doi:10.1016/j.scriptamat.2005.03.005.
Huang et al., "Fretting wear behavior of bulk amorphous steel", Intermetallics, Jun. 12, 2011, vol. 19, pp. 1385-1389, doi:10.1016/j.intermet.2011.04.014.
Inoue et al., "Cobalt-based bulk glassy alloy with ultrahigh strength and soft magnetic properties", Nature Materials, Oct. 21, 2003, vol. 2, pp. 661-663, doi:10.1038/nmat982.
Inoue et al., "Development and applications of late transition metal bulk metallic glasses", Bulk Metallic Glasses, pp. 1-25, 2008.
Inoue et al., "Developments and applications of bulk metallic glasses", Reviews on Advanced Materials Science, Feb. 28, 2008, vol. 18, pp. 1-9.
Inoue et al., "Preparation of 16 mm Diameter Rod of Amorphous Zr65Al7.5Ni10Cu17.5 Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267, doi.10.1016/j.actamat.2010.11.027.
Ishida et al., "Wear Resistivity of Super-Precision Microgear Made of Ni-Based Metallic Glass", Materials Science and Engineering, Mar. 25, 2007, vol. A449-451, pp. 149-154, doi:10.1016/j.msea.2006.02.300.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Microstructure evolution and mechanical properties of Cu46Zr47Al7 bulk metallic glass composite containing CuZr crystallizing phases", Materials Science and Engineering A 467 (2007) 139-145.
Jiang et al., "Tribological Studies of a Zr-Based Glass-Forming Alloy with Different States", Advanced Engineering Materials, Sep. 14, 2009, vol. 1, No. 11, pp. 925-931, DOI: 10.1002/adem.200900184.

Johnson et al., "Quantifying the Origin of Metallic Glass Formation", Nature Communications, Jan. 20, 2016, vol. 7, 10313, 7 pgs., doi: 10.1038/ncomms10313.
Jung et al., "Fabrication of Fe-based bulk metallic glass by selective laser melting: A parameter study", Materials and Design, Jul. 30, 2015, vol. 86, pp. 703-708, http://dx.doi.org/10.1016/j.matdes.2015.07.145.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim et al., "Amorphous Phase Formation of Zr-Based Alloy Coating by HVOF Spraying Process", Journal of Materials Science, Jan. 1, 2001, vol. 36, pp. 49-54.
Kim et al., "Design and synthesis of Cu-based metallic glass alloys with high glass forming ability", Journal of Metastable and Nanocrystalline Materials, Sep. 1, 2005, vols. 24-25, pp. 93-96, doi:10.4028/www.scientific.net/JMNM.24-25.93.
Kim et al., "Enhancement of Metallic Glass Properties of Cu-Based BMG Coating by Shroud Plasma Spraying", Science Direct, Surface & Coatings Technology, Jan. 25, 2011, vol. 205, pp. 3020-3026, doi:10.1016/j.surfcoat.2010.11.012.
Kim et al., "Oxidation and Crystallization Mechanisms in Plasma-Sprayed Cu-Based Bulk Metallic Glass Coatings", Acta Materialia., Feb. 1, 2010, vol. 58, pp. 952-962, doi:10.1016/j.actamat.2009.10.011.
Kim et al., "Production of Ni65Cr15P16B4 Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307, doi:10.1016/j.scriptamat.2011.04.037.
Kim et al., "Weldability of $Cu_{54}Zr_{22}Ti_{18}Ni_6$ bulk metallic glass by ultrasonic welding processing", Materials Letters, May 17, 2014, vol. 130, pp. 160-163, http://dx.doi.org/10.1016/j.matlet.2014.05.056.
Kobayashi et al., "Fe-Based Metallic Glass Coatings Produced by Smart Plasma Spraying Process", Materials Science and Engineering, 2007, vol. B148, pp. 110-113, doi:10.1016/j.mseb.2007.09.035.
Kobayashi et al., "Mechanical Property of Fe-Base Metallic Glass Coating Formed by Gas Tunnel Type Plasma Spraying", ScienceDirect, Surface & Coatings Technology, (2007), 6 pgs., doi:10.1016/j.surfcoat.2007.09.011.
Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158, DOI 10.1007/s11249-009-9444-4.
Kozachkov et al., "Effect of cooling rate on the volume fraction of B2 phases in a CuZrAlCo metallic glass matrix composite", Intermetallics, Apr. 19, 2013, vol. 39, pp. 89-93, http://dx.org/10.1016/j.intermet.2013.03.017.
Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326, doi:10.1016/j.msen.2003.10.086.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller The Better", Advanced Materials, Jan. 25, 2011, vol. 23, pp. 461-476, doi: 10.1002/adma.201002148.
Kumar et al., "Embrittlement of Zr-based Bulk Metallic Glasses", Science Direct, Acta Materialia, 2009, vol. 57, pp. 3572-3583, available online May 11, 2009, doi: 10.1016/j.actamat.2009.04.16.
Kwon et al., "Wear Behavior of Fe-Based Bulk Metallic Glass Composites", Journal of Alloys and Compounds, Jul. 14, 2011, vol. 509S, pp. S105-S108, doi:10.1016/j.jallcom.2012.12.108.

(56) References Cited

OTHER PUBLICATIONS

Launey et al., "Fracture toughness and crack-resistance curve behavior in metallic glass-matrix composites", Applied Physics Letters, Jun. 18, 2009, vol. 94, pp. 241910-1-241910-3, DOI: 10.1063/1.3156026.

Launey et al., "Solution to the Problem of the Poor Cyclic Fatigue Resistance of Bulk Metallic Glasses", PNAS Early Edition, pp. 1-6, Jan. 22, 2009, www.pnas.org/cgi/doi/10.1073/pnas.0900740106., Jan. 22, 2009.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131, doi:10.1016/j.actamat.2004.05.025.

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948, doi:10.1016/j.msea.2006.02.014.

Li et al., "Selective laser melting of Zr-based bulk metallic glasses: Processing, microstructure and mechanical properties", Materials and Design, Sep. 21, 2016, vol. 112, pp. 217-226, http://dx.doi.org/10.1016/j.matdes.2016.09.071.

Li et al., "Wear Behavior of Bulk $Zr_{41}Ti_{14}Cu_{12.5}Ni_{10}Be_{22.5}$ Metallic Glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; Jul. 1, 2008, 22nd Annual Conference on Fossil Energy Materials, Pittsburgh, U.S., 8 pgs.

Lin et al., "Designing a toxic-element-free Ti-based amorphous alloy with remarkable supercooled liquid region for biomedical application", Intermetallics, Jul. 9, 2014, vol. 55, pp. 22-27, http://dx.doi.org/10.1016/j.intermet.2014.07.003.

List et al., "Impact Conditions for Cold Spraying of Hard Metallic Glasses", Journal of Thermal Spray Technology, Jun. 1, 2012, vol. 21, No. 3-4, pp. 531-540, DOI: 10.1007/s11666-012-9750-5.

Liu et al., "Influence of Heat Treatment on Microstructure and Sliding Wear of Thermally Sprayed Fe-Based Metallic Glass Coatings", Tribol. Lett., Mar. 4, 2012, vol. 46, pp. 131-138, DOI: 10.1007/s11249-012-9929-4.

Liu et al., "Metallic Glass Coating on Metals Plate by Adjusted Explosive Welding Technique", Applied Surface Science, Jul. 16, 2009, vol. 255, pp. 9343-9347, doi:10.1016/j.apsusc.2009.07.033.

Liu et al., "Microstructure and Properties of Fe-Based Amorphous Metallic Coating Produced by High Velocity Axial Plasma Spraying", Science Direct, Journal of Alloys and Compounds, Apr. 23, 2009, vol. 484, pp. 300-307, doi:10.1016/j.jallcom.2009.04.086.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear Behavior of a Zr-Based Bulk Metallic Glass and Its Composites", Journal of Alloys and Compounds, May 5, 2010, vol. 503, pp. 138-144, doi:10.1016/j.jallcom.2010.04.2170.

Lu et al., "Crystallization Prediction on Laser Three-Dimensional Printing of Zr-based Bulk Metallic Glass", Journal of Non-Crystalline Solids, 2017, vol. 461, pp. 12-17, available online Jan. 29, 2017, http://dx.doi.org/10.1016/j.jnoncrysol.2017.01.038.

Lupoi et al., "Deposition of Metallic Coatings on Polymer Surfaces Using Cold Spray", Science Direct, Surface & Coatings Technology, Sep. 6, 2010, vol. 205, pp. 2167-2173, doi:10.1016/j.surfcoat.2010.08.128.

Ma et al., "Wear Resistance of Zr-Based Bulk Metallic Glass Applied in Bearing Rollers", Materials Science and Engineering, May 4, 2004, vol. A386, pp. 326-330.

Maddala et al., "Effect of Notch Toughness and Hardness on Sliding Wear of $Cu_{50}hf_{41.5}a_{18.5}$ Bulk Metallic Glass", Scripta Materialia, Jul. 6, 2011, vol. 65, pp. 630-633, doi:10.1016/j.scriptamat.2011.06.046.

Madge, "Toughness of Bulk Metallic Glasses", Metals, Jul. 17, 2015, vol. 5, Issue 3, pp. 1279-1305, ISSN 2075-4701, doi: 10.3390/met5031279.

Mahbooba et al., "Additive manufacturing of an iron-based bulk metallic glass larger than the critical casting thickness", Applied Materials Today, Feb. 27, 2018, vol. 11, pp. 264-269, https://doi.org/10.1016/j.apmt.2018.02.011.

Narayan et al., "On the hardness and elastic modulus of bulk metallic glass matrix composites", Scripta Materialia, Jun. 9, 2010, vol. 63, Issue 7, pp. 768-771, doi:10.1016/j.scriptamat.2010.06.010.

Ni et al., "High Performance Amorphous Steel Coating Prepared by HVOF Thermal Spraying", Journal of Alloys and Compounds, 2009, vol. 467, pp. 163-167, doi:10.1016/j.jallcom.2007.11.133.

Nishiyama et al., "Recent progress of bulk metallic glasses for strain-sensing devices", Materials Science and Engineering: A, Mar. 25, 2007, vols. 449-451, pp. 79-83, doi:10.1016/jmsea.2006.02.384.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286, doi:10.1016/j.actamat.201.08.006.

Parlar et al., "Sliding Tribological Characteristics of Zr-Based Bulk Metallic Glass", Intermetallics, Jan. 2008, vol. 16, pp. 34-41, doi:10.1016/j.intermet.2007.07.001.

Pauly et al., "Modeling Deformation Behavior of Cu—Zr—Al Bulk Metallic Glass Matrix Composites", Applied Physics Letters, Sep. 2009, vol. 95, pp. 101906-1-101906-3, doi:10.1063/1.3222973.

Pauly et al., "Processing Metallic Glasses by Selective Laser Melting", Materials Today, Jan./Feb. 2013, vol. 16, pp. 37-41 http://dx.org/10.1016/j.mattod.2013.01.018.

Pauly et al., "Transformation-mediated ductility in CuZr-based bulk metallic glasses", Nature Materials, May 16, 2010, vol. 9, Issue 6, pp. 473-477, DOI:10.1038/NMAT2767.

Ponnambalam et al., "Fe-Based Bulk Metallic Glasses With Diameter Thickness Larger Than One Centimeter", J Mater Res, Feb. 17, 2004. vol. 19; pp. 1320-1323, DOI: 10.1557/JMR.2004.0176.

Porter et al., "Incorporation of Amorphous Metals into MEMS for High Performance and Reliability", Rockwell Scientific Company, Final Report, Nov. 1, 2003, 41 pgs.

Prakash et al., "Sliding Wear Behavior of Some Fe-, Co- and Ni-Based Metallic Glasses During Rubbing Against Bearing Steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756, doi: 10.1016/j.msea.2010.08.055.

Qiao et al., "Metallic Glass Matrix Composites", Materials Science and Engineering, Feb. 2016, vol. 100, pp. 1-69, http://dx.doi.org.10.10163/jmser.2015.12.001.

Ramamurty et al., "Hardness and Plastic Deformation in a Bulk Metallic Glass", Acta Materialia, Feb. 2005, vol. 53, pp. 705-717, doi:10.1016/j.actamat.20004.10.023.

Revesz et al., "Microstructure and Morphology of Cu—Zr—Ti Coatings Produced by Thermal Spray and Treated by Surface Mechanical Attrition", Science Direct, Journal of Alloys and Compounds, Jul. 14, 2011, vol. 509S, pp. S482-S485, doi:10.1016/j.jallcom.2010.10.170.

Rigney et al., "The Evolution of Tribomaterial During Sliding: A Brief Introduction", Tribol. Lett, Jul. 1, 2010, vol. 39, pp. 3-7, DOI: 10.1007/s11249-009-9498-3.

Roberts, "Developing and Characterizing Bulk Metallic Glasses for Extreme Applications", XP055731434, Retrieved from the Internet (Dec. 16, 2013): URL:https://thesis.library.caltech.edu/8049/141/Scott_Roberts_thesis_2013_Complete_ Thesis. pdf [retrieved on Sep. 17, 2020].

Roberts et al., "Cryogenic Charpy Impact Testing of Metallic Glass Matrix Composites", Scripta Materialia, Nov. 11, 2011, 4 pgs., doi:10.1016/j.scriptamat.2011.01.011.

Sanders et al., "Stability of Al-rich glasses in the Al—La—Ni system", Intermetallics, 2006, vol. 14, pp. 348-351, doi: 10.1016/j.intermet.2005.06.009.

Schuh et al., "A Survey of Instrumented Indentation Studies on Metallic Glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., Apr. 28, 2012, vol. 47, pp. 131-138, DOI: 10.1007/s11249-012-9969-9.

(56) References Cited

OTHER PUBLICATIONS

Shen et al., "3D printing of large, complex metallic glass structures", Materials and Design, Mar. 2017, vol. 117, pp. 213-222, http://dx.doi.org/10.1016/j.matdes.2016.12.087.

Shen et al., "Exceptionally High Glass-Forming Ability of an Fecocrmocby Alloy", Applied Physics, Apr. 5, 2005, vol. 86, pp. 151907-1-151907-3, DOI: 10.1063/1.1897426.

Singer et al., "Wear behavior of triode-sputtered MoS2 coatings in dry sliding contact with steel and ceramics", Wear, Jul. 1996, vol. 195, Issues 1-2, pp. 7-20.

Sinmazcelik et al., "A review: Fibre metal laminates, background, bonding types and applied test methods", Materials and Design, vol. 32, Issue 7, 3671, Mar. 4, 2011, pp. 3671-3685, doi:10.1016/j.matdes.2011.03.011.

Song et al., "Strategy for pinpointing the formation of B2 CuZr in metastable CuZr-based shape memory alloys", Acta Materialia, Aug. 6, 2011, vol. 59, pp. 6620-6630, doi:10.1016/j.actamat.2011.07.017.

Sun et al., "Fiber metallic glass laminates", J. Mater. Res., Dec. 2010, vol. 25, No. 12, pp. 2287-2291, DOI: 10.1557/JMR.2010.0291.

Sundaram et al., "Mesoscale Folding, Instability, and Disruption of Laminar Flow in Metal Surfaces", Physical Review Letters, Sep. 7, 2012, vol. 109, pp. 106001-1-106001-5, DOI: 10.1103/PhysRevLett.109.106001.

Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.

Tam et al., "Abrasion Resistance of Cu Based Bulk Metallic Glasses", Journal of Non-Crystalline Solids, Oct. 18, 2004, vol. 347, pp. 268-272, doi:10.1016/j.noncrysol.2004.09.008.

Tam et al., "Abrasive Wear of Cu60zr30ti10 Bulk Metallic Glass", Materials Science and Engineering, Apr. 1, 2004, vol. A384 pp. 138-142, doi:10.1016/j.msea.2004.05.73.

Tan et al., "Synthesis of La-based in-situ bulk metallic glass matrix composite", Intermetallics, Nov. 2002, vol. 10, Issues 11-12, pp. 1203-1205.

Tao et al., "Effect of Rotational Sliding Velocity on Surface Friction and Wear Behavior in Zr-Based Bulk Metallic Glass", Journal of Alloys and Compounds, Mar. 4, 2010, vol. 492, pp. L36-L39, doi:10.1016/j.jallcom.2009.11.113.

Tao et al., "Influence of Isothermal Annealing on the Micro-Hardness and Friction Property in Cuzral Bulk Metallic Glass", Advanced Materials Research, Jan. 1, 2011, vols. 146-147, pp. 615-618, doi: 10.4028/www.scientific.net/AMR.146-147.615.

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.

Wang et al., "Progress in Studying the Fatigue Behavior of Zr-Based Bulk-Metallic Glasses and Their Composites", Intermetallics, Mar. 6, 2009, vol. 17, pp. 579-590, doi:10.1016/j.intermet.2009.01.017.

Whang et al., "Microstructures and age hardening of rapidly quenched Ti—Zr—Si alloys", Journal of Materials Science Letters, 1985, vol. 4, pp. 883-887.

Wu et al., "Bulk Metallic Glass Composites with Transformation-Mediated Work-Hardening and Ductility", Adv. Mater., Apr. 26, 2010, vol. 22, pp. 2770-2773, DOI: 10.1002/adma.201000482.

Wu et al., "Dry Sliding tribological behavior of Zr-based bulk metallic glass", Transactions of Nonferrous Metals Society of China, Jan. 16, 2012, vol. 22, Issue 3, pp. 585-589, DOI: 10.1016/S10003-6326(11)61217-X.

Wu et al., "Effects of Environment on the Sliding Tribological Behaviors of Zr-Based Bulk Metallic Glass", Intermetallics, Jan. 27, 2012, vol. 25, 115-125, doi:10.1016/j.intermet.2011.12.025.

Wu et al., "Formation of Cu—Zr—Al bulk metallic glass composites with improved tensile properties", Acta Materialia 59, Feb. 19, 2011, pp. 2928-2936, doi:10.1016/j.actamat.2011.01.029.

Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.

Yao et al., "Fe-Based Bulk Metallic Glass With High Plasticity", Applied Physics Letters, Feb. 5, 2007, vol. 90, 061901, doi: 10.1063/1.2437722.

Yin et al., "Microstructure and Mechanical Properties of a Spray-Formed Ti-Based Metallic Glass Former Alloy", Journal of Alloys and Compounds, Jan. 25, 2012, vol. 512, pp. 241-245, doi:10.1016/j.jallcom.2011-09.074.

Yokoyama et al., "Relations between the Thermal and Mechanical Properties of Cast Zr-TM-Al (TM: Cu, Ni, or Co) Bulk Glassy Alloys", Materials Transactions, vol. 48, No. 7 (2007) pp. 1846-1849.

Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.

Zachrisson et al., "Effect of Processing on Charpy Impact Toughness of Metallic Glass Matrix Composites", Journal of Materials Research, May 28, 2011, vol. 26, No. 10, pp. 1260-1268, DOI: 10.1557/jmr.2011.92.

Zhang et al., "Abrasive and Corrosive Behaviors of Cu—Zr—Al—Ag—Nb Bulk Metallic Glasses", Journal of Physics: Conference Series, 2009, vol. 144, pp. 1-4, doi:10.1088/1742-6596/1441/1/012034.

Zhang et al., "Robust Hydrophobic Fe-Based Amorphous Coating by Thermal Spraying", Applied Physics Letters, Sep. 20, 2012, vol. 101, pp. 121603-1-121603-4.

Zhang et al., "Wear Behavior of a Series of Zr-Based Bulk Metallic Glasses", Materials Science and Engineering, Feb. 25, 2008, vol. A475, pp. 124-127, doi: 10.1016/j.msea.2007.05.039.

Zheng et al., "Processing and Behavior of Fe-Based Metallic Glass Components via Laser-Engineered Net Shaping", Metallurgical and Materials Transactions A, 40A, 1235-1245, DOI: 10.1007/s11661-009-9828-y.

Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350, DOI: 10.1007/s11666-010-9570-4.

Zhu et al., "Ta-particulate reinforced Zr-based bulk metallic glass matrix composite with tensile plasticity", Scripta Materialia, Mar. 2010, vol. 62, Issue 5, pp. 278-281, doi:10.1016/j.scriptamat.2009.11.018.

Zhuo et al., "Ductile Bulk Aluminum-Based Alloy with Good Glass-Forming Ability and High Strength", Chinese Physics Letters, 2009, vol. 26, No. 6, pp. 066402-1-066402-4.

Zhuo et al., "Spray Formed Al-Based Amorphous Matrix Nanocomposite Plate", Journal of Alloys and Compounds, Mar. 1, 2011, vol. 509, pp. L169- L173, doi:10.1016/j.jallcom.2011.02.125.

* cited by examiner

SYSTEMS AND METHODS FOR IMPLEMENTING BULK METALLIC GLASS-BASED MACROSCALE GEARS

CROSS-REFERENCE TO RELATED APPLICATIONS

The current application is a continuation of U.S. application Ser. No. 16/259,772, filed Jan. 28, 2019, which application is a continuation of U.S. application Ser. No. 13/928,109, filed Jun. 26, 2013, which application claims priority to U.S. Provisional Application No. 61/664,620, filed Jun. 26, 2012, the disclosures of which are incorporated herein by reference in their entireties.

STATEMENT OF FEDERAL FUNDING

The invention described herein was made in the performance of work under a NASA contract, and is subject to the provisions of Public Law 96-517 (35 U.S.C. 202) in which the Contractor has elected to retain title.

FIELD OF THE INVENTION

The present invention generally relates to bulk metallic glass-based macroscale gears.

BACKGROUND

Gears are pervasive engineering components that are commonly used in a variety of actuation mechanisms. For example, gears are typically used to drive automobiles, bicycles, extraterrestrial vehicles, and even watches. Because they experience constant stress during operation, it is desirable that gears be formed of strong and robust materials.

A relatively new class of materials that may be well suited for the fabrication of gears are metallic glasses, also known as amorphous alloys. Metallic glasses are characterized by their disordered atomic-scale structure in spite of their metallic constituent elements—i.e., whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, the manufacture of metallic glass materials lends itself to relatively easy processing. In particular, the manufacture of a metallic glass can be compatible with an injection molding process.

Nonetheless, the manufacture of metallic glasses presents challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g., on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g., greater than 1 mm). These thicker metallic glasses are known as 'bulk metallic glasses' ("BMGs").

Although metallic glasses can now be formed in dimensions that can allow them to be more useful, the current state of the art has yet to understand BMG materials properties to an extent where 'macroscale' gears, for example those of the size that are typically used to drive robotics (e.g., those produced by Maxon Motor), can be efficiently designed. Accordingly, there exists a need to have a fuller understanding of the materials properties of BMGs such that a BMG-based macroscale gear can be efficiently designed, fabricated, and implemented.

SUMMARY OF THE INVENTION

Systems and methods in accordance with embodiments of the invention implement bulk metallic glass-based macroscale gears. In one embodiment, a method of fabricating a bulk metallic glass-based macroscale gear, where at least either the thickness of the gear is greater than 3 mm or the diameter of the gear is greater than 9 mm, includes: obtaining design parameters of the gear to be formed; selecting a bulk metallic glass from which the gear will be formed based on the obtained design parameters, where the selected bulk metallic glass is characterized by a resistance to standard modes of wear and a resistance to brittle fracture such that a gear can be formed from the selected bulk metallic glass that accords with the obtained design parameters; and fabricating the gear from the selected bulk metallic glass that accords with the obtained design parameters.

In another embodiment, the obtained design parameters are based on the gear's anticipated operational setting.

In yet another embodiment, the obtained design parameters include at least one of: the dimensions of the gear to be formed; the desired extent of the gear's resistance to brittle fracture; and the desired extent of the gear's resistance to standard modes of wear.

In still another embodiment, the obtained design parameters include the dimensions of the gear to be formed, the desired extent of the gear's resistance to brittle fracture, and the desired extent of the gear's resistance to standard modes of wear.

In still yet another embodiment, the extent of the gear's resistance to brittle fracture is determined based on its constituent material's fracture toughness.

In a further embodiment, the selected bulk metallic glass material is characterized by a fracture toughness of between approximately 20 MPa*m$^{1/2}$ and 80 MPa*m$^{1/2}$.

In a yet further embodiment, the extent of a gear's resistance to standard modes of wear is determined based on its constituent material's hardness.

In a still further embodiment, the selected bulk metallic glass material has a Vickers hardness value of at least 400.

In a still yet further embodiment, the extent of the gear's resistance to standard modes of wear is determined based on its constituent material's performance in a pin-on-disk test.

In another embodiment, the selected bulk metallic glass is an alloy based on one of: Zr, Ti, Cu, Pd, and Pt.

In yet another embodiment, the selected bulk metallic glass is a TiZrBeX alloy, wherein X is a late transition metal.

In still another embodiment: the atomic percentage of Ti is between approximately 30% and 60%; the atomic percentage of Zr is between approximately 15% and 35%; the atomic percentage of Be is between approximately 7% and 35%; and the atomic percentage of the combination of all other constituent elements is less than approximately 20%.

In still yet another embodiment, the selected bulk metallic glass is one of: $Ti_{45}Zr_{16}Be_{20}Cu_{10}Ni_9$, $Ti_{30}Zr_{35}Be_{26.8}Cu_{8.2}$, and $Ti_{40}Zr_{25}Be_{30}Cr_5$.

In a further embodiment, the temperature of the environment at which the gear is anticipated to operate is below 0° C., and the selected bulk metallic glass is characterized by a resistance to brittle failure at the anticipated operating temperature and under the corresponding anticipated operating conditions.

In a yet further embodiment, the obtained design parameters include a desired threshold resistance to brittle failure at the anticipated temperature that is determined by constituent material's Charpy impact energy at the anticipated temperature.

In a still further embodiment, the desired threshold Charpy impact energy at the anticipated temperature is correlated with a threshold Charpy impact energy at room temperature using a known relationship of Charpy impact energy as a function of temperature; and selecting the bulk metallic glass based on its correlated threshold Charpy impact energy at room temperature.

In a still yet further embodiment, the known relationship of Charpy impact energy as a function of temperature is linear.

In another embodiment, the known relationship of Charpy impact energy as a function of temperature is 0.02 J/° C.

In still another embodiment, selecting a bulk metallic glass includes: identifying an alloy system that is known to have a resistance to brittle failure that accords with the obtained design parameters; and assessing micro-alloyed variants of the alloy system to select a particular composition that has a resistance to standard modes of wear as well as a resistance to brittle failure, from which a gear can be formed that accords with the obtained design parameters.

In a further embodiment, a method of fabricating a bulk metallic glass-based macroscale gear, where at least either the thickness of the gear is greater than 3 mm or the diameter of the gear is greater than 9 mm, includes: obtaining design parameters of the gear to be formed; selecting a bulk metallic glass from which the gear will be formed based on the obtained design parameters, where the selected bulk metallic glass is characterized by a resistance to brittle failure such that a gear can be formed from the selected bulk metallic glass that accords with the obtained design parameters; and fabricating the gear from the selected bulk metallic glass that accords with the obtained design parameters.

In another embodiment, a bulk metallic glass-based macroscale gear, where at least either the thickness of the gear is greater than 3 mm or the diameter of the gear is greater than 9 mm, includes a bulk metallic glass that is resistant to standard modes of wear and resistant to brittle failure.

In yet another embodiment, the fracture toughness of the bulk metal glass is between approximately 20 MPa*m$^{1/2}$ and 80 MPa*m$^{1/2}$.

In still another embodiment, the bulk metallic glass has a Vickers hardness value of at least 450.

In still yet another embodiment, the bulk metallic glass is a TiZrBeX alloy, where X is a late transition metal.

In a further embodiment: the atomic percentage of Ti is between approximately 30% and 60%; the atomic percentage of Zr is between approximately 15% and 35%; the atomic percentage of Be is between approximately 7% and 35%; and the atomic percentage of the combination of all other constituent elements is less than approximately 20%.

In a yet further embodiment, the bulk metallic glass is one of: $Ti_{45}Zr_{16}Be_{20}Cu_{10}Ni_9$, $Ti_{30}Zr_{35}Be_{26.8}Cu_{8.2}$, and $Ti_{40}Zr_{25}Be_{30}Cr_5$.

DETAILED DESCRIPTION

Figure 1:
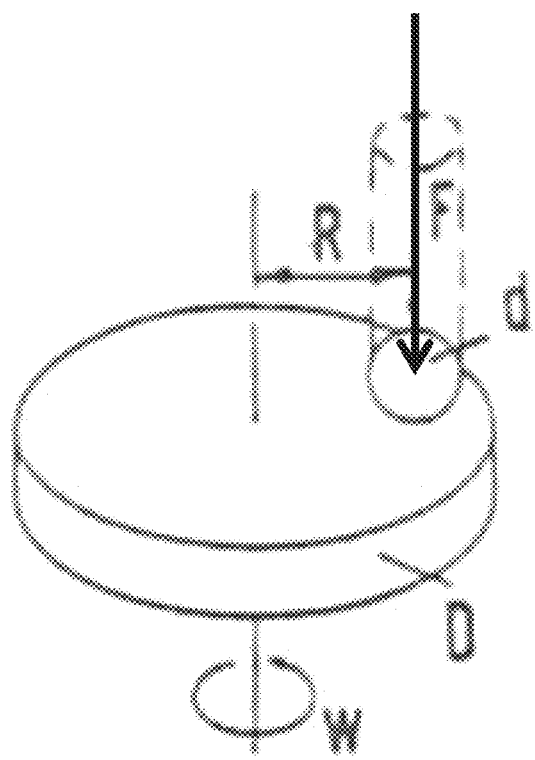
FIG. 1 illustrates the pin-on-disk method that is virtually standardized in assessing a material's wear performance.

Turning now to the drawings, systems and methods for implementing bulk metallic glass-based macroscale gears are illustrated. Bulk metallic glasses (BMGs) possess a number of useful materials properties (e.g., high tensile strength, corrosion resistance, electrical conductivity, processability), and have been well studied for their potential as advanced engineering materials. In particular, BMGs have been extensively studied for their potential implementation in applications that require wear resistance. (see e.g., Wu, Trans. Nonferrous Met. Soc. China 22 (2012), 585-589; Wu, Intermetallics 25 (2012) 115-125; Kong, Tribal Lett (2009) 35:151-158; Zenebe, Tribol Lett (2012) 47:131-138; Chen, J. Mater. Res., Vol. 26, No. 20, Oct. 28, 2011; Liu, Tribol Lett (2012) 46:131-138; the disclosures of which are hereby incorporated by reference.) To be clear, "wear" conventionally refers to the displacement of the surface of a material as a direct result of its mechanical interaction with another material. It is generally understood that a material's resistance to wear generally increases with its hardness, i.e., the harder a material is, the less susceptible it is to wear. (See e.g., I. L. Singer, Wear, Volume 195, Issues 1-2, July 1996, Pages 7-20.) Resistance to wear is typically determined by subjecting a sample to a process that causes wear, and measuring the mass of the sample before and after the 'wear-causing' process. For example, FIG. 1 depicts a pin-on-disk setup that is standard in determining a material's resistance to wear. In the illustration, a sphere with a diameter, d, is applied with a force, F, to a disk with a diameter, D. The force, F, is applied at a radial distance, R, from the disk's center. The disk is then rotated through w revolutions as the force, F, is being applied. The mass of the disk is determined before and after it has been subjected to the force F. Accordingly, the difference in mass reflects the amount of material that was 'worn away' by the process, i.e., the 'wear loss'. And of course, wear loss is inversely correlated with wear resistance; in other words, the more a material wears away, the less resistant it is to wear loss.

Figure 2:
FIG. 2 illustrates a general understanding of how bulk metallic glass (BMG) wear performance is expected to vary with hardness.
Figure 3:
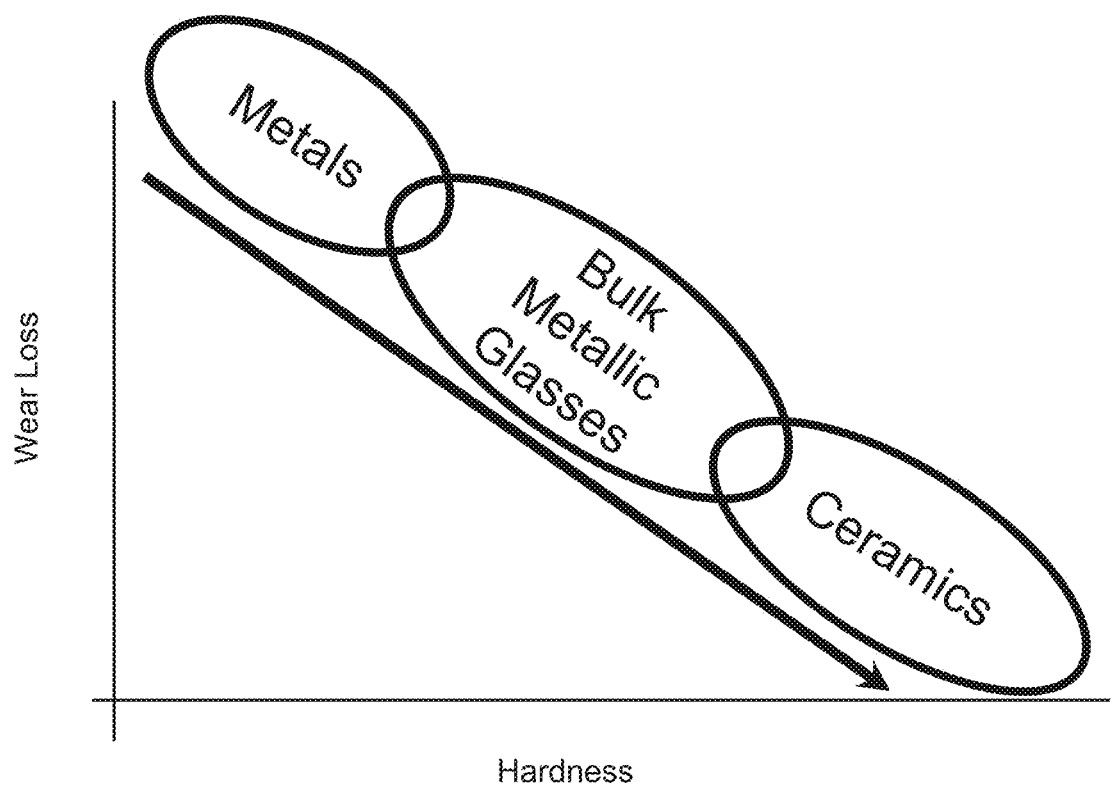
FIG. 3 illustrates a general understanding of the expected wear performance of BMGs relative to metals and ceramics.

FIG. 2 illustrates the general understanding that the resistance to wear of BMGs is generally expected to increase with hardness—in other words, the harder a BMG is, the less susceptible it is expected to be to wear loss. FIG. 3 illustrates an Ashby plot that reflects a general understanding of the resistance to wear of BMGs relative to metals and ceramics. As can be seen from the plot, BMGs are generally harder materials than metals, but softer than ceramics. Accordingly, their resistance to wear is predicted to be in between that of ceramics and that of metals. Although they are typically not as hard as ceramics, they possess other materials properties that can make them advantageous over ceramics, and can thereby compensate for any potential shortcomings with respect to hardness. For example, generally speaking, BMGs are more processable than ceramics, and they are relatively less brittle.

Based on these understandings, it has been suggested that the predicted wear-resistance characteristics of BMGs may make them excellent candidates for materials from which to fabricate gears, given that gears are subject to extensive mechanical interaction and are thereby subject to wear. (See e.g., Chen, J. Mater. Res., Vol. 26, No. 20, Oct. 28, 2011; Huang, Intermetallics 19 (2011) 1385-1389; Liu, Tribol Lett (2009) 33:205-210; Zhang, Materials Science and Engineering A, 475 (2008) 124-127; Ishida, Materials Science and Engineering A, 449-451 (2007) 149-154; the disclosures of which are hereby incorporated by reference.) However, although using BMGs to make gears has been postulated on this basis, the current state of the art is lacking in a method for efficiently producing superior macroscale gears—e.g., gears where at least either the thickness is greater than approximately 3 mm or the diameter is greater than approximately 9 mm—using BMG materials. Gears of these dimensions are pervasive engineering components, and are frequently used, for example, to drive robotics. To be clear, microscale gears have been produced from BMG materials. (See e.g., Ishida, Materials Science and Engineering A, 449-451 (2007) 149-154, the disclosure of which is hereby incorporated by reference.) However, the inventors of the instant application have observed that modes of failure for macroscale gears and microscale gears differ in appreciable ways, such that simply forming a macroscale gear from a conventional BMG material without any further insight could result in a sub-standard gear. More specifically, the inventors have observed that the normal forces typically sustained during macroscale gear operation, aside from the surface-to-surface sliding interaction that are the typical focus of tribological studies, play a critical role in determining the viability of the macroscale gear insofar as these forces can cause brittle fracture. Conversely, as will be elaborated on more thoroughly below, brittle fracture is not as critical of a consideration on a microscale. Indeed, although Ishida et al. have reported the fabrication of a functional microgear, their gears were lubricated during during testing. (See e.g., Ishida, Materials Science and Engineering A, 449-451 (2007) 149-154.) Lubrication can help thwart tendencies for brittle fracture. In many instances, the superior BMG-based macroscale gears implemented in accordance with the instant application are sufficiently robust that they can achieve acceptable performance without the benefit of a lubricant. BMG-based macroscale gears that do not require lubrication during operation can be much more versatile engineering components.

Accordingly, the inventors have observed that it is not sufficient to form a macroscale gear from a BMG primarily considering the BMG's glass forming ability and/or its resistance to standard modes of wear. Instead, to produce a superior macroscale gear, the constituent BMG must be carefully selected/developed so that it has sufficient resistance to brittle fracture. Accordingly, in many embodiments of the invention, a method of fabricating a BMG-based macroscale gear, where at least either the thickness of the gear is greater than 3 mm or the diameter of the gear is greater than 9 mm, includes: obtaining design parameters of the gear to be formed; selecting a BMG from which the gear will be formed based on the obtained design parameters, where the selected BMG is characterized by a resistance to standard modes of wear and a resistance to brittle fracture such that a gear can be formed from the selected BMG that accords with the obtained design parameters; and fabricating the gear from the selected BMG that accords with the obtained design parameters. BMG-based macroscale gears produced in accordance with this design methodology can yield much more robust and practical gears than those that are typically produced from metals or ceramics using conventional processes. For example, these gears can have hardness values that approach those of ceramics, but at the same time have fracture toughness values that far exceed those of ceramics. These enhanced material properties can enable gears to be implemented in applications where they previously were not suitable. Moreover, it can be much easier to fabricate gears from BMGs than from ceramics. Furthermore, BMG material properties can be tunable by varying their composition. For example, they can be made to be more or less tough based on varying the ratios of the constituent elements. In particular, the inventors have observed that BMG can have fracture toughness values that range from 1 MPa*m$^{1/2}$ to 200 MPa*m$^{1/2}$. Similarly, the hardness values also vary over a wide spectrum.

Note that conventional methods of fabricating BMG-based macroscale gears tend to presume that BMGs will have sufficient fracture toughness, and typically focus largely on selecting harder materials. Conversely, in many embodiments, the fracture toughness is given preeminent consideration in the material selection process for a BMG-based macroscale gear; the selected material may then processed (e.g., by microalloying) to develop its hardness as necessary.

Furthermore, in connection with this design methodology, the inventors have observed that the wear performance for BMG-based macroscale gears is substantially impacted by the temperature at which the gears are expected to operate. In particular, the inventors have observed that relatively tougher BMGs that are typically prone to abrasive wear and galling at room temperatures, and are thereby generally worse candidate materials to make macroscale gears that operate at room temperature, can actually be more preferable candidate materials for gears that operate at extremely low temperatures.

The design principles and methodologies that the inventors of the instant application have determined will now be discussed.

BMG Gear Design

The material selection aspect of the design of BMG-based gears has conventionally been based on avoiding standard modes of wear, e.g.: abrasive wear, which refers to when a rough, hard surface or particle creates gouges or troughs in a softer surface; and adhesive wear (galling), which refers to when material is transferred from one substrate to the other through intimate contact at high pressure. Accordingly, the pin-on-disk method (discussed above and illustrated in FIG. 1) is typically extensively relied upon in the material selection process, as it is the standardized method for determining wear performance with respect to standard modes of wear. In many instances, a standardized ASTM pin-on-disk configuration is used to assess wear loss, that employs a steel wear ball 100 g weight, and 1.2 km of wear track, run at 200 rpm. Conventionally, the BMG materials that demonstrate the best performance in the pin-on-disk test are presumed to be the preferred materials from which to form a gear.

However, the inventors have observed that this design methodology premise is particularly deficient in designing gears that are larger than certain a critical dimension, and are thereby on a 'microscale'. More specifically, above this critical dimension, the brittle nature of BMGs adopts an enhanced role in determining their viability as a gear material. Throughout this application, 'macroscale' is used to refer to dimensions, above which BMG-based gears begin to develop a strong tendency to demonstrate brittle failure during operation. This can happen when the gear dimensions are larger than the plastic zone size (where gear dimensions are smaller than the plastic zone size, brittle fracture can typically be avoided). For example, it has been observed that the ductility of a BMG material is inversely correlated with its thickness. (See e.g., Conner, Journal of Applied Physics, Volume 94, Number 2, Jul. 15, 2003, pgs. 904-911, the disclosure of which is hereby incorporated by reference.) The inventors have particularly observed that gears that have a thickness that is slightly above approximately the plastic zone radius of the constituent BMG material begin to demonstrate susceptibility to brittle failure. Essentially, as gear dimensions become greater, they become more and more prone to brittle failure. Conversely, BMG-based gears that have relatively smaller dimensions, e.g., microscale gears, are not as prone to brittle failure because of their small size, and thereby the brittle nature that BMGs can demonstrate is not as significant of a consideration in the material selection process for such gears. The inventors have further observed that BMG-based gears that have dimensions such that at least either the thickness is greater than 3 mm or the diameter is greater than 9 mm, can be particularly prone to brittle fracture. In many embodiments, methods for designing BMG gears in this relatively larger size and above, where gears are commonly used in engineering applications, are implemented.

Figure 4:
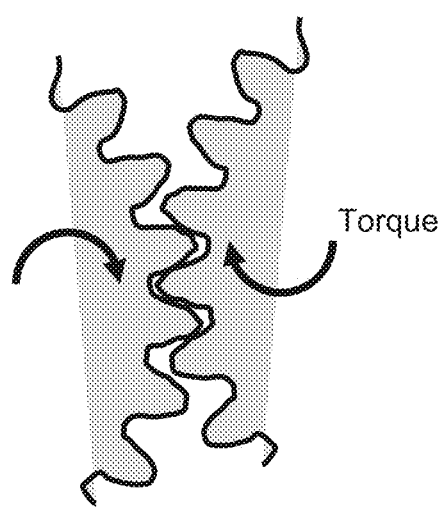
FIG. 4 illustrates role of torque during the operation of gears.

Importantly, note that, as illustrated in FIG. 4, gears experience torque during operation, which can serve to apply a force that precipitates brittle failure. Thus, relying largely on a BMG's performance in a pin-on-disk test as a measure of material suitability can be fallacious as a pin-on-disk test largely applies compressive forces and thereby does not provide any indication as to a sample's resistance to brittle failure. Hence, whereas a material selection process that relies on BMGs' respective performances in a pin-on-disk test may be suitable in the design of a microscale gear (i.e., where brittle failure is not as much of a consideration), relying exclusively on this methodology would be deficient in designing a macroscale gear.

Figure 5A:
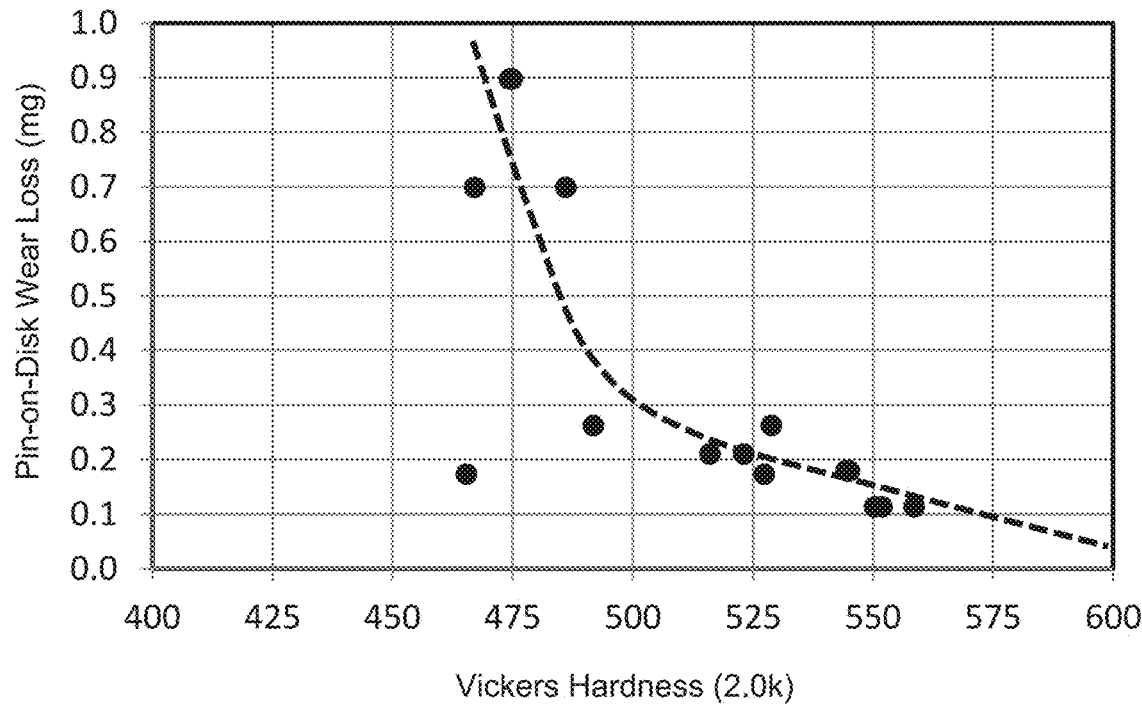
FIGS. 5A and 5B illustrate how wear loss, as determined by the pin-on-disk method, and fracture toughness vary with Vickers hardness.
Figure 5B:
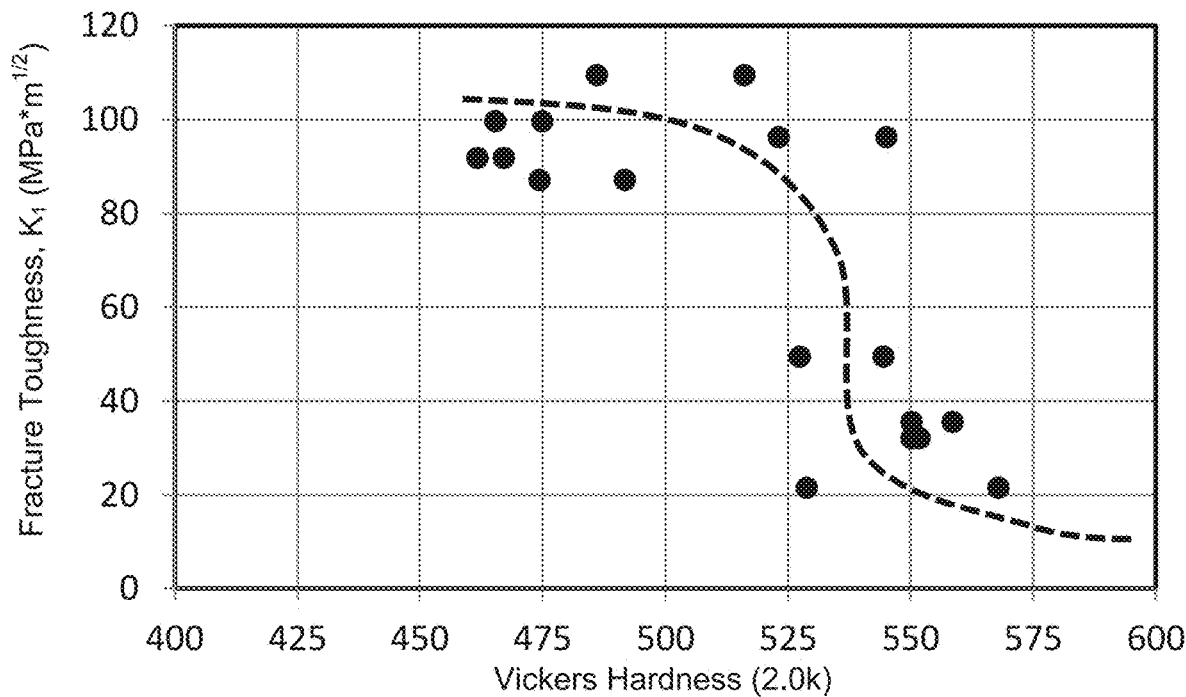

For example, a plot of pin-on-disk wear loss as a function of Vickers hardness for Zirconium, Titanium, and Copper-based BMGs is illustrated in FIG. 5A. As is evident from the plot, and in accordance with the conventional understanding of materials properties, wear loss and hardness are negatively correlated for these alloys, i.e., materials with higher hardness tend to experience less wear loss generally speaking. This tends to be especially true in alloys with a hardness value greater than approximately 550 Vickers. Thus, in accordance with conventional design methodologies, the BMGs with the lowest wear loss, as measured by the pin-on-disk method, would be preferred as the constituent material from which to form a gear. In fact, this methodology drives much of the scientific literature on improving wear resistance in BMGs. However, a corresponding plot of fracture toughness vs. hardness for the exact same alloys in FIG. 5A is depicted in FIG. 5B. As is evident from the plot, and also in conformance with conventional understanding of materials properties, fracture toughness is also inversely correlated with hardness, i.e., materials with higher hardness values tend to have lower fracture toughness values (and correspondingly, they tend to be more brittle). Thus, where a BMG-based macroscale gear is to be formed, the material selection aspect of the design process should not simply focus on selecting the material that has a minimal wear loss in accordance with a pin-on-disk method (typically the materials that have higher hardness values), because as demonstrated by FIG. 5B, such materials may not have the requisite fracture toughness. Therefore, in accordance with many embodiments of the invention, in selecting a material to form a macroscale BMG-based gear, both a BMG material's resistance to standard modes of wear (e.g., indicated by pin-on-disk tests) and its resistance to brittle fracture (e.g., as indicated by its fracture toughness) are accounted for.

In a number of embodiments, a particular alloy composition is selected based on its resistance to brittle fracture, and the particular alloy composition is then processed (e.g., by microalloying) to develop its resistance to standard modes of wear as necessary. For example, in some embodiments, selecting the BMG includes identifying an alloy system that is known to have a resistance to brittle failure that is desired, and assessing variants of the alloy system to select a particular composition that achieves the desired resistance to wear and the desired resistance to brittle fracture. The variants can be achieved by for example micro-alloying the system, or even by processing. Of course, any way of selecting a BMG that results in a BMG that meets a desired criterion for resistance to wear and resistance to brittle fracture can be implemented. Note that conventional material selection processes for forming BMG-based gears seemingly presume that a BMG has the requisite resistance to brittle failure.

Figure 6A:
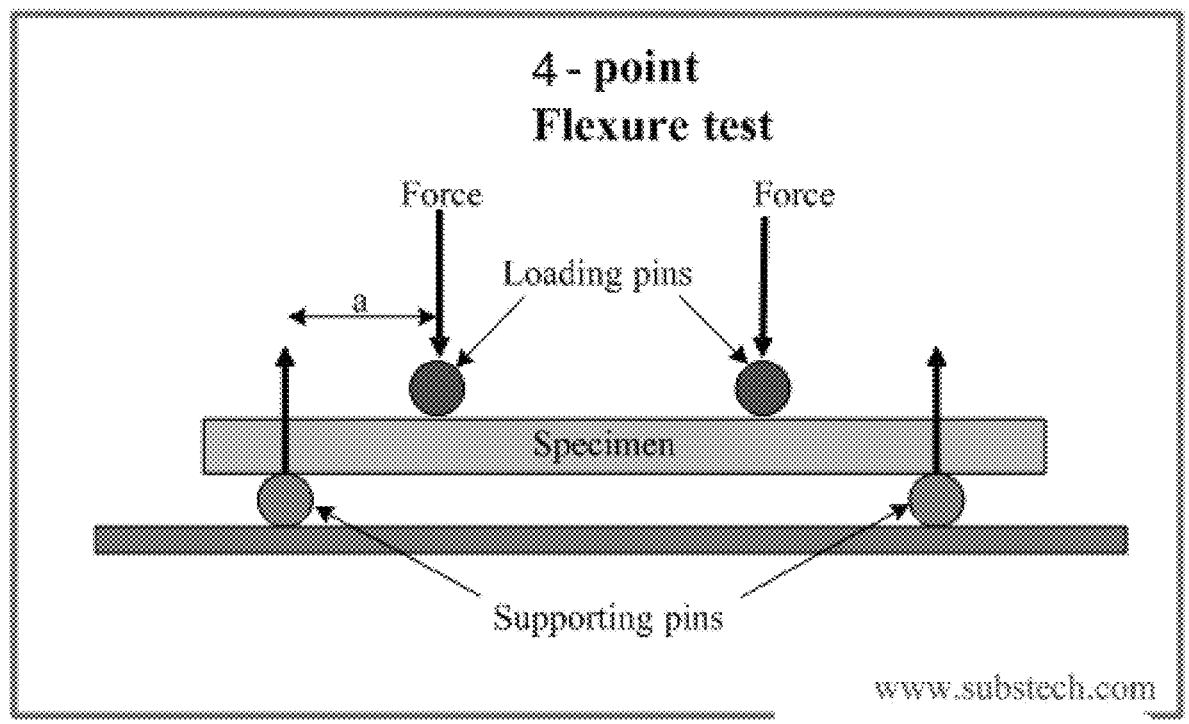
FIGS. 6A and 6B illustrate a 4-point flexure test that can be used to determine fracture toughness, in accordance with embodiments of the invention.
Figure 6B:
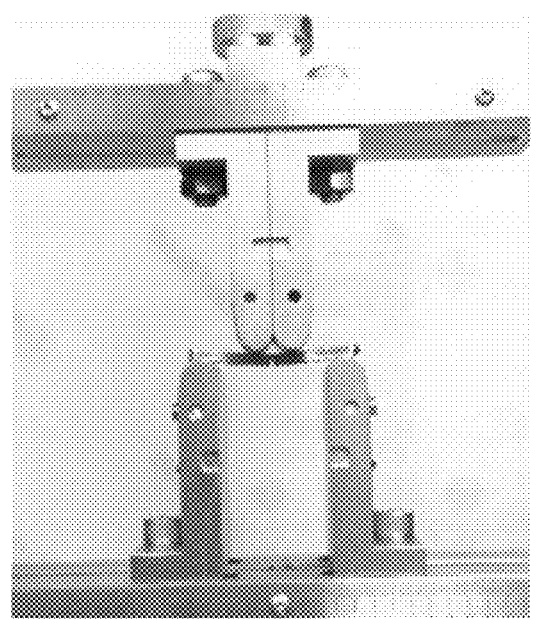

Of course, a material's fracture toughness can be determined by any of a variety of methods. For example, a 4-point flexure test, as depicted in FIG. 6, may be used. In essence, in accordance with the test, a specimen (or 'sample') is placed on supporting pins, and loading pins are applied with a force at a horizontal distance away from the supporting pins. The plot in FIG. 5B was obtained using 3.5 mm×3.5 mm beams of BMG material that were notched and then bent. FIG. 6B illustrates the particular setup that was used to obtain the data depicted in FIG. 5B. ASTM standards can be used to calculate the fracture toughness from these tests (and were used in computing the data depicted in the plot in FIG. 5B).

Figure 7:
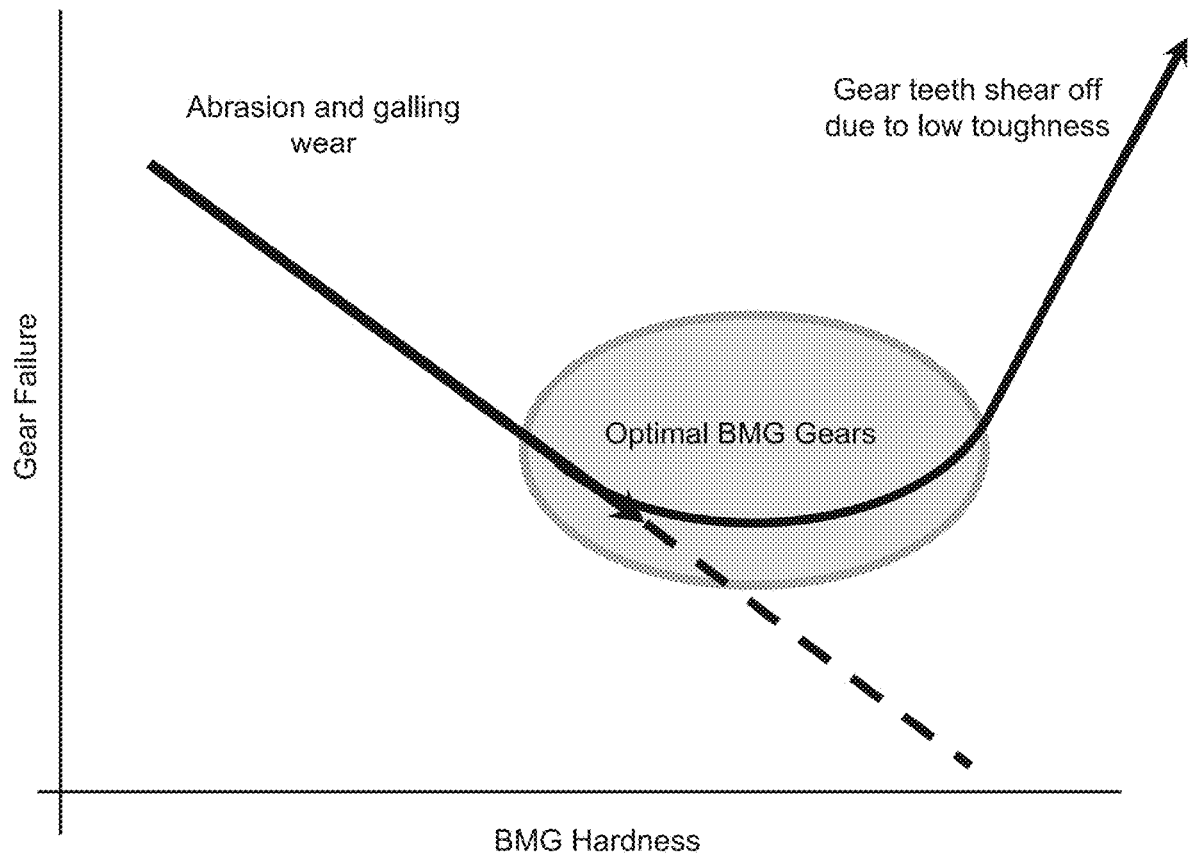
FIG. 7 illustrates a new paradigm for material selection for BMG-based macroscale gears in accordance with embodiments of the invention.

Accordingly, the inventors present a novel paradigm, illustrated in FIG. 7, for the material selection process in the fabrication of BMG-based macroscale gears; the paradigm is well-suited for the cases when BMG hardness can be correlated with wear loss and fracture toughness (i.e., when an increase in hardness results in a corresponding reduction in fracture toughness and a corresponding reduction in wear loss). Specifically, FIG. 7 depicts a plot of gear failure as a function of hardness. Note that the straight solid line that continues into the dashed line reflects the considerations of the material selection process in accordance with conventional design methodology. Conventionally, the materials selection process was largely concerned with avoiding abrasion and galling wear; thus the conventional materials selection process was largely focused on selecting the material that demonstrated the best performance in pin-on-disk testing, which typically were the harder materials. However, as discussed above, the brittle nature of BMGs must be accounted for when designing BMG-based macroscale gears. Accordingly, FIG. 7 shows an upward trend in gear failure beyond a particular hardness, which is reflective of brittle fracture, e.g., gear teeth shearing off. Generally, as discussed above, in selecting a material from which to form a BMG, a BMG must be selected that adequately balances the need to avoid standard modes of wear such as abrasion and galling, and brittle failure. This balance is reflected in the lower points on the curve, and designated "Optimal BMG Gears." Thus, in a sense, it is desirable to implement a BMG that is relatively toward the 'minimum' of this curve. BMG-based macroscale gears fabricated from BMG materials with these relative properties will exhibit reduced occurrences of brittle fracture, while still retaining wear resistance that is superior to tougher metal alternatives.

Figure 8:
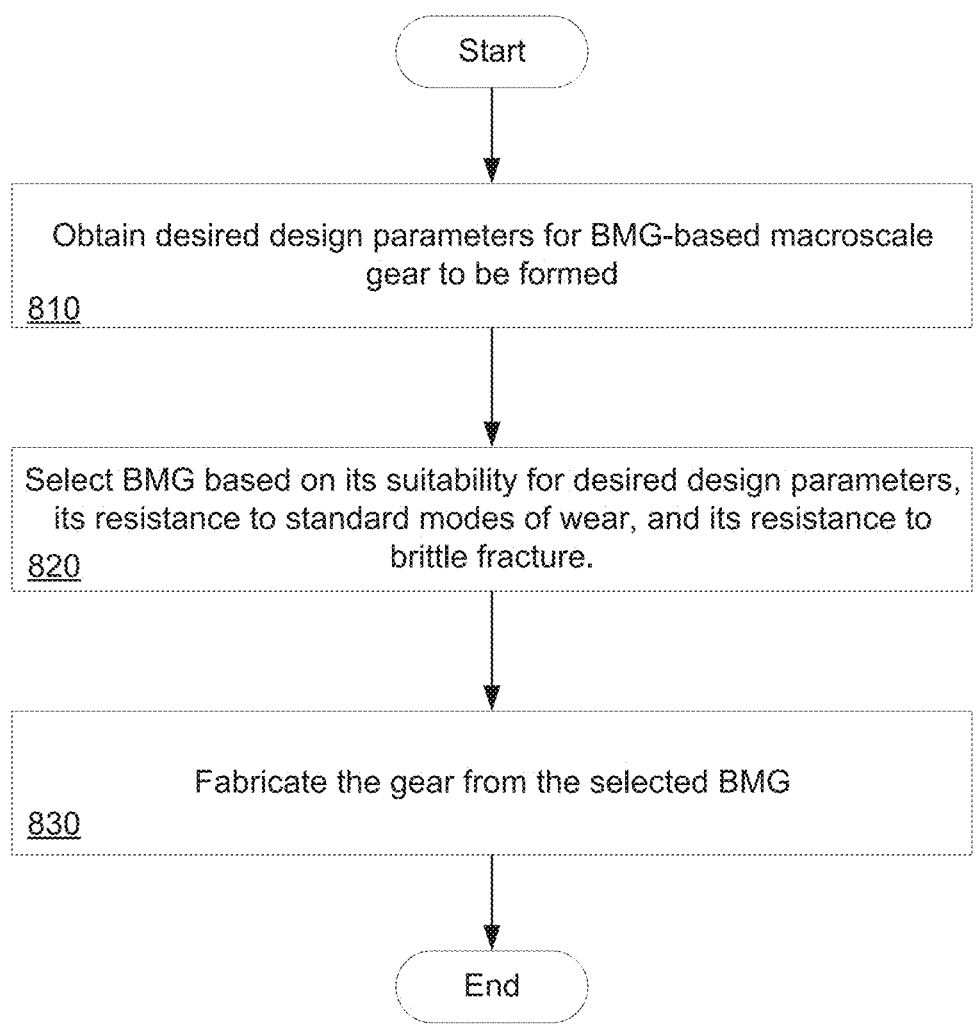
FIG. 8 illustrates a flowchart for the fabrication of a BMG-based macroscale gear in accordance with embodiments of the invention.

Hence, in a number of embodiments of the invention, a method of fabricating a BMG-based macroscale gear includes selecting a BMG from which to form the gear wherein the selection criterion includes considering the BMG's resistance to conventional modes of wear (e.g., abrasive wear and galling); and its resistance to brittle failure. The selection criterion may further include the BMG's glass forming ability, which is a commonly desired trait in BMG-component manufacturing applications. A method of fabricating a BMG-based macroscale gear that includes: obtaining the desired design parameters of the BMG-based macroscale gear to be formed; selecting a BMG from which the gear will be formed based on its suitability for the desired design parameters, its resistance to standard modes of wear, and its resistance to brittle fracture; and fabricating the gear from the selected BMG is illustrated in FIG. 8. Of course, any criterion may be used to judge a BMG's resistance to standard modes of wear and its resistance to brittle failure in accordance with embodiments of the invention. For example, as alluded to above, a BMG's resistance to standard modes of wear can be determined by its performance in a pin-on-disk test, and it's resistance to brittle failure can be determined by its fracture toughness. Alternatively, a BMG's resistance to standard modes of wear can be determined by measuring its hardness. Additionally, in many embodiments, the BMG is further selected based on its glass forming ability.

The fabrication process initially begins with obtaining (810) the design parameters for the BMG-based macroscale gear to be formed. For example, the following parameters may be obtained: the dimensions of the gear, the desired extent of the gear's resistance to brittle fracture, the desired extent of the gear's resistance to standard modes of wear loss, the anticipated operating temperature, the anticipated operating environment; desired robustness in view of the anticipated operating contact stress and/or torque; the desired density; the desired corrosion resistance; and any desired corresponding factor of safety. Of course, this list is not meant to be exhaustive, and merely meant to be illustrative of the sorts of parameters that may be obtained in accordance with embodiments of the invention. Note that in many embodiments, the design parameters include a requisite resistance to brittle fracture and a requisite resistance to standard modes of wear. And of course, the design parameters may be based on the anticipated operational setting for the gear to be formed.

Accordingly, a BMG is selected (820) based on its suitability in view of the desired design parameters, its resistance to standard modes of wear, and its resistance to brittle fracture. As alluded to above, in some embodiments the BMG is selected in further view of its glass forming ability. Typically, the glass forming ability of a BMG is a universally desired trait, but based upon the particular fabrication process, a BMG with relatively lesser glass forming ability may suffice. As discussed above, the dimensions of the gear to be formed impacts the requisite material properties, and thereby impacts material selection. Specifically, as discussed above, gears that are manufactured on a macroscale are more prone to brittle fracture, and thereby BMGs that are sufficiently resistant to brittle fracture are required to form macroscale gears. Accordingly, in many embodiments, the material selection is made in view of the desired gear dimensions. Of course, the stress and/or torque that are expected to be applied to the gear (along with any desired factor of safety) also impact the required resistance to standard modes of wear and to brittle fracture, and thereby influence the material selection process. In many embodiments, a BMG is selected that has a wear volume loss of less than 2 mm$^3$ in an ASTM pin-on-disk testing setup that uses a steel wear ball 100 g weight, 1.2 km of total wear track, run at 200 rpm. In a number of embodiments, a BMG is selected that has a hardness value of greater than approximately 400 on the Vickers scale.

The anticipated operating environment also impacts BMG material selection. For example, it has been determined that BMGs may be less prone to abrasive wear and galling when they are in an oxygen-free environment. (See e.g., Hong, Trans. Nonferrous Met. Soc. China 22(2012) 585-589.) Accordingly, where it is known that the gear to be formed will operate in an oxygen-free environment, then more emphasis can be placed on finding a suitable BMG with sufficient resistance to brittle fracture (e.g., as indicated by fracture toughness). Moreover, as will be more fully elaborated on below, the anticipated operating temperature will also impact the material selection process; if the gear is expected to be operating at low temperatures, then it is generally more preferable to select materials that are more resistant to brittle fracture at room temperature, even though they may have poorer resistance to standard modes of wear at room temperature.

The inventors have also observed that in many instances it is preferable to select a BMG material as opposed to a BMG composite material (e.g., a material that is characterized by crystalline phases within an amorphous matrix). In particular, the inventors have observed that BMG composites do not perform well as gear materials as they tend undergo brittle fracture during operation if the reinforcing phase is hard, and they undergo severe abrasive wear loss if the reinforcing phase is soft. Thus, in many embodiments, a BMG that is substantially free of any crystalline phases is selected.

Of course these are merely examples of how the material selection process is impacted by obtained design parameters in accordance with embodiments of the invention. But it should be clear that the obtained design parameters can be assessed in any of a variety of ways in order to facilitate the material selection process in accordance with embodiments of the invention. With these parameters and assessments in mind, a material can be selected that satisfies the design parameters.

Based on the material selection, a macroscale gear may be fabricated (830). Of course, any suitable fabrication process may be implemented in accordance with embodiments of the invention. For example, the gear may be fabricated using casting plates, and then using EDM to form the gear teeth. Alternatively, the gear may be cast to a net gear shape outright.

In a number of embodiments, the BMG is coated with a hard, wear-resistant coating (e.g., Mo-based alloys) to further improve its wear characteristics. Of course, the BMG can be augmented in any way in accordance with embodiments of the invention.

Laboratory results that validate the above-described approach are now described below.

Demonstration of Viability of Approach

Figure 9A:
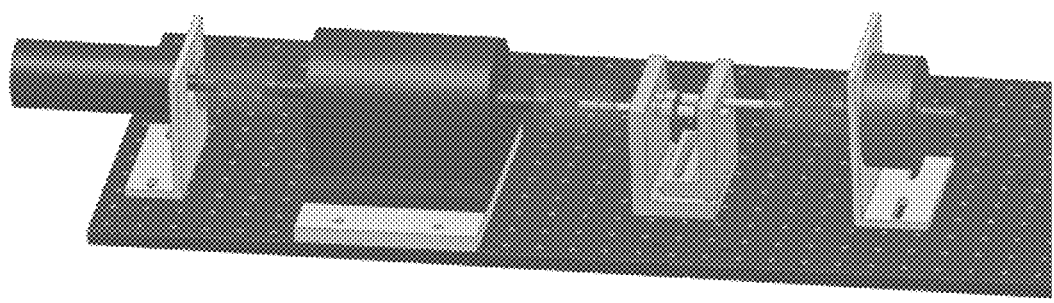
FIGS. 9A-9C illustrate the gear rig and gears that were used in testing the design principles described in the instant application.
Figure 9B:
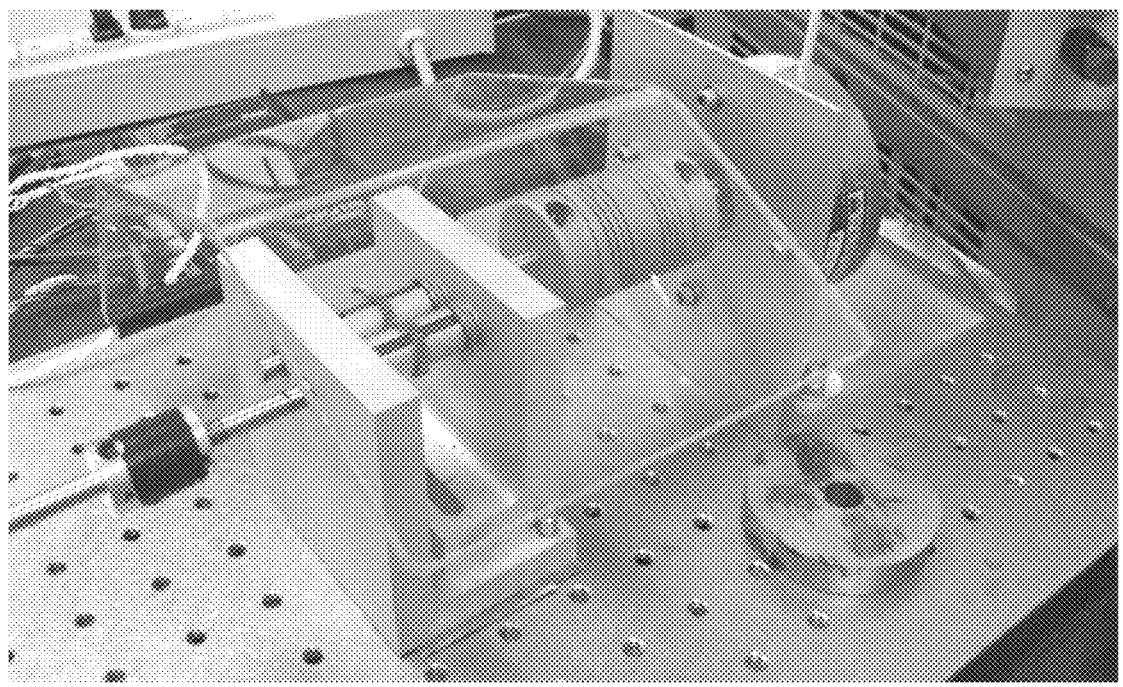
Figure 9C:
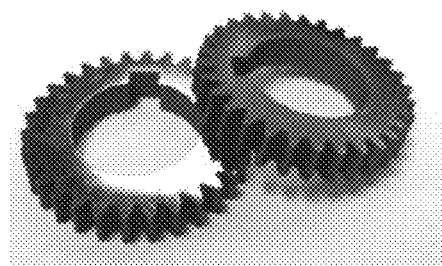

The above-described approach has been validated through lab experimentation. Zr, Ti, and Cu BMG gears were fabricated by casting plates and EDM-EDM was used to shape the gear teeth. The gears had 30 teeth, 48 diametral pitch gears, with a pressure angle of 20°. Wear loss was determined by weighing the gears before and after the tests. FIG. 9A depicts a diagram of the gear testing rig; FIG. 9B depicts a photograph of the gear testing rig; and FIG. 9C depicts a photograph of the gears tested. Essentially, the gears were subject to a simulated operational environment. In particular, they were run at 10 in.-lbs. of torque for 61,500 revolutions in open air at room temperature.

Figure 10A:
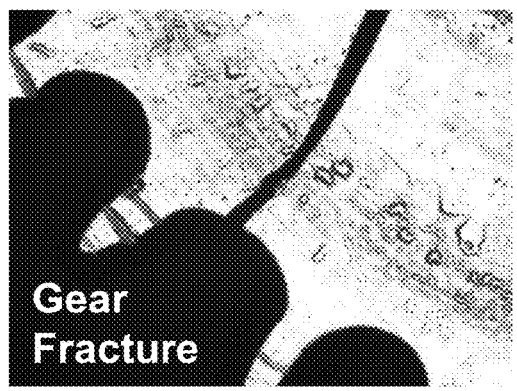
FIGS. 10A-10D illustrate the types of gear failure seen during testing.
Figure 10B:
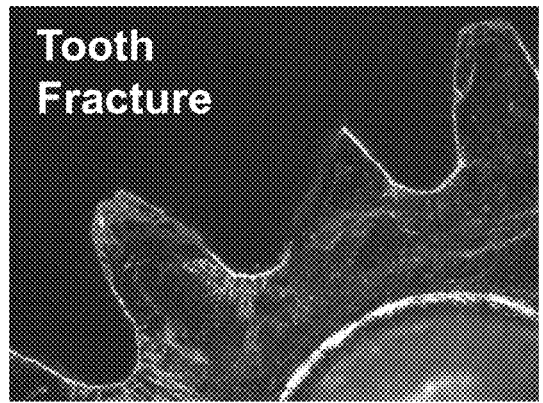
Figure 10C:
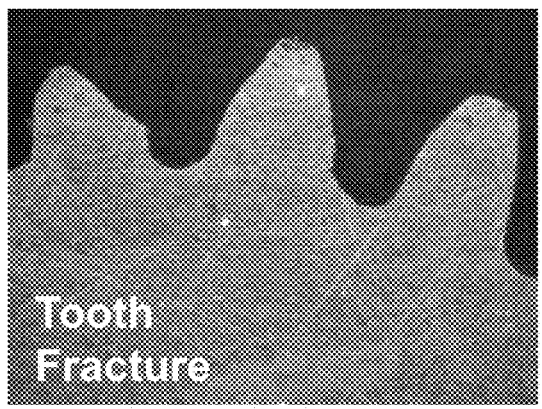
Figure 10D:
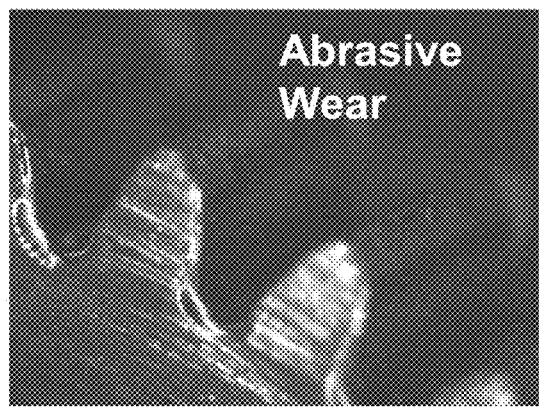

FIGS. 10A-10D illustrate the types of wear/failure that were seen during the testing. In particular, FIG. 10A illustrates a gear that fractured through its body. FIGS. 10B and 10C illustrate tooth fractures. And FIG. 10D illustrates abrasive wear (which can be seen as a notch in the gear tooth).

Figure 11A:
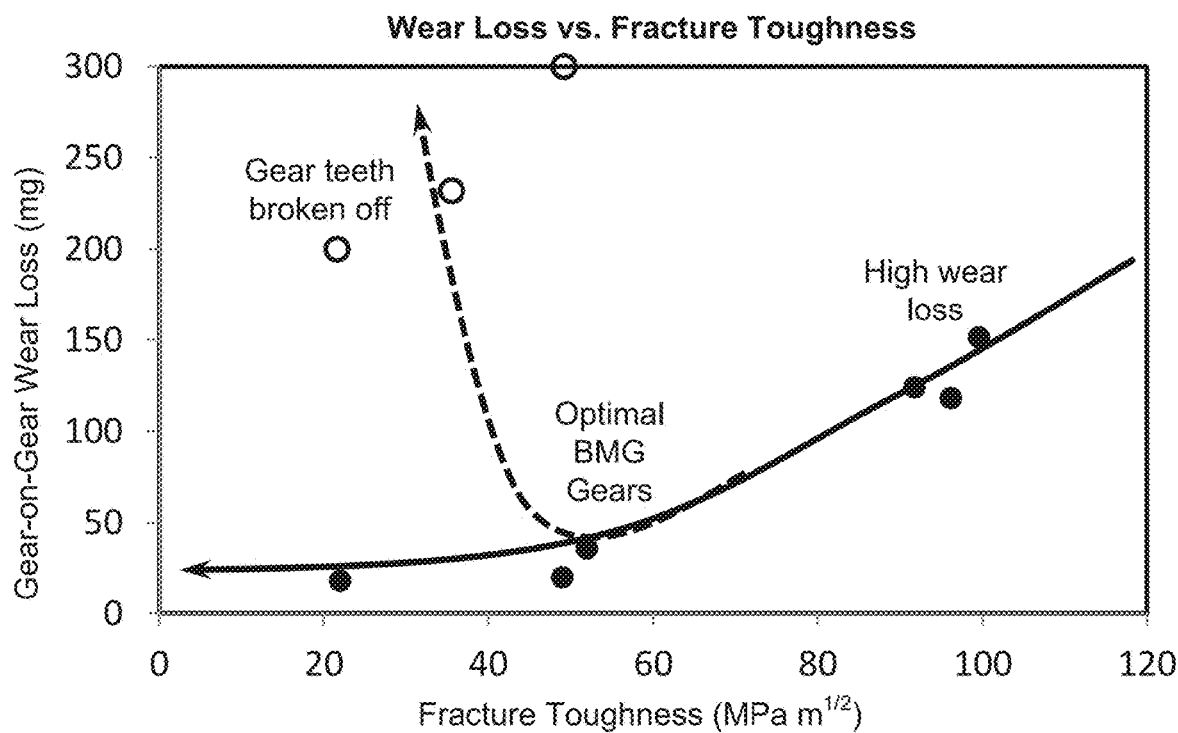
FIGS. 11A-11B illustrate two plots that reflect the results of the testing.
Figure 11B:
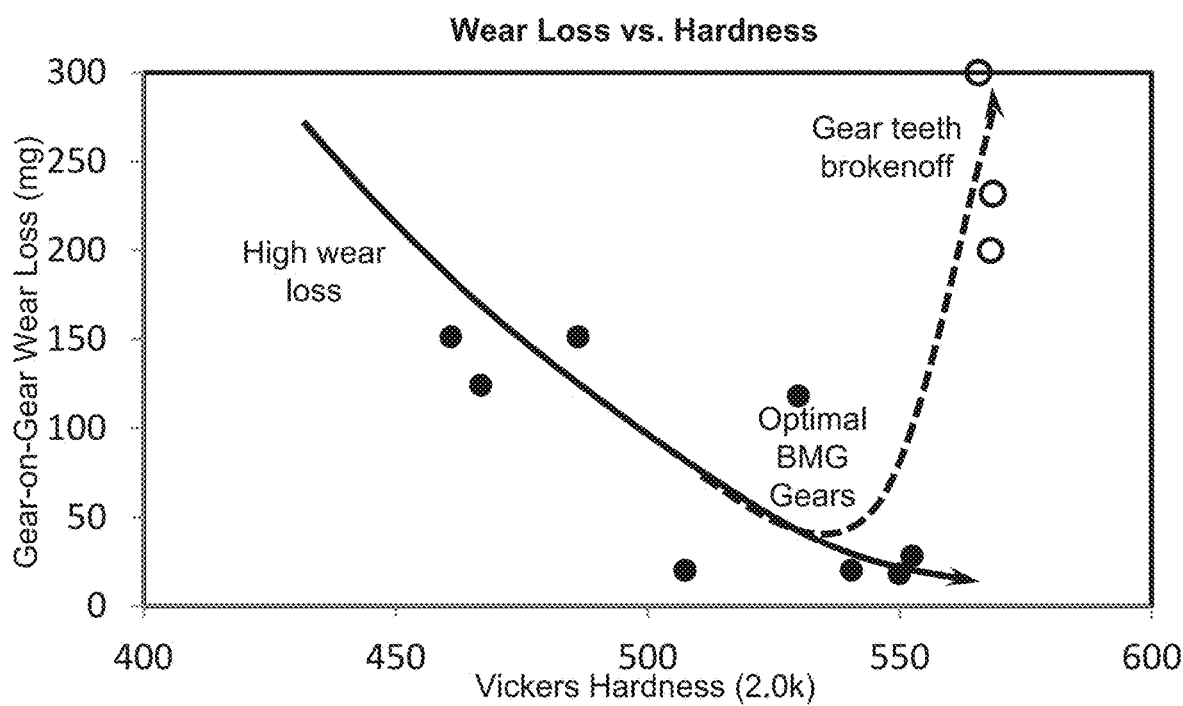

FIGS. 11A and 11B depict the plots that reflect the results that were obtained. In particular, FIG. 11A is a plot of the wear loss as a function of fracture toughness for the fabricated Zr, Ti, and Cu BMG gears. Similarly, FIG. 11B is a plot of wear loss as a function of hardness. Note that open circles reflect the gears that failed under a brittle mode— their teeth sheared off or the gear outright fractured (the data point that reflects a 300 mg 'wear loss' was actually an outright fracture of the gear). Essentially, wear loss improved with decreasing fracture toughness until the alloys became too brittle and their respective teeth sheared off. Accordingly, in many embodiments, BMG materials are iteratively tested in a gear rig setup (similar to that seen in FIGS. 9A and 9B) to ensure their viability as a prospective macroscale gear material. Note generally, that the-above described results reflect the above-described novel understanding of BMG-based macroscale gear design, i.e., to construct a superior BMG-based macroscale gear, the constituent BMG must possess sufficient resistance to brittle fracture as well as sufficient resistance to standard modes of wear.

The inventors have generally observed that resistance to brittle fracture (e.g., which can be measured by fracture toughness) is generally more important than resistance to standard modes of wear (e.g., which can be measured by pin-on-disk tests) in designing BMG-based macroscale gears. In other words, in selecting a BMG material from which to form a macroscale gear, it is generally best to begin with the understanding that BMGs are substantially glass-like or ceramic-like (e.g., hard and brittle), and then selecting/developing BMG that have sufficient fracture toughness without overly compromising their beneficial glass-like qualities (i.e., their hardness). By contrast, conventional material selection methodology (where harder materials are typically selected for their presumed ability to withstand standard modes of wear) seemingly adopts a contrary approach; i.e., the conventional approach seemingly assumes that BMGs are sufficiently metallic (have sufficient fracture toughness, but may be lacking in hardness) and therefore seems primarily focused on developing/implementing BMGs that have the highest hardness under the presumption that they will still have sufficient fracture toughness.

Indeed, in many embodiments, a BMG material, from which to fabricate a gear, is selected primarily based on its resistance to brittle fracture. Primarily focusing on resistance to brittle fracture as a selection criterion is partly based on the notion that many BMGs have a sufficient resistance to standard modes of wear loss for many gear applications, and thus resistance to brittle fracture is the primary variable. Further, in some senses, resistance to brittle failure can be related to resistance to wear loss. For example as demonstrated above, materials that are resistant to brittle fracture tend to be softer, and thereby more prone to standard modes of wear. Accordingly, in many instances it is preferable to select a material from which to form a macroscale gear that is sufficiently resistant to brittle fracture, but not too resistant to brittle fracture.

With these understandings, the inventors have observed that BMG materials with fracture toughness values of between 20 and 80 MPa*m$^{1/2}$ generally make for superior BMG-based macroscale gears. However, for low torque gears, a fracture toughness of between 10 and 20 MPa*m$^{1/2}$ may be sufficient. Moreover, the inventors note that almost all Ni, Fe, Nb, Mg, Al, La-based BMGs have lower fracture toughness values than is required for the described superior macroscale gears.

However, Ti-based BMGs offer excelling combinations of glass-forming ability, toughness, low wear loss, and low density. The development of Ti-based BMG macroscale gears in accordance with the above-described design principles is now discussed below.

TI-Based BMG Macroscale Gears

Through their works, the inventors have determined that Ti-based BMG has shown particular promise as a material from which to form BMG-based macroscale gears. More specifically, TiZrBeX BMGs (where X can be one or more element, and is typically a late transition metal, e.g., Cu, Ni, Fe, Co, etc.), which are low-density and have a fracture toughness and wear loss which can be controlled through alloying, were developed to produce superior candidates for the fabrication of a macroscale gear. Typically, the alloys can have the following composition (in atomic percentages): 30-60% Ti; 15-35% Zr; 7-35% Be; and less than 20% any other elements. The densities can be between 4.5-6.0 g/cm$^3$. The Young's Modulus can be between 90-115 GPa. The hardness can be between 400-550 on the Vickers scale (2.0 k). And the alloys can have a glass forming ability of at least 4 mm. Gear diameters with diameters of at least 5 mm and a thickness of at least 1 mm were formed.

Table 1 below enumerates the results of the testing of gears formed with the various listed compositions:

TABLE 1

Wear Characteristics of TiZrBeX BMGs

| BMG Alloy | Wear loss (mg) | Fracture Toughness (MPa m$^{1/2}$) | Hardness (2.0k) |
|---|---|---|---|
| Ti$_{30}$Zr$_{35}$Cu$_{8.2}$Be$_{26.8}$ | 124 | 91.8 | 467 |
| Ti$_{40}$Zr$_{25}$Cu$_9$Ni$_8$Be$_{18}$ | fractured | 49.2 | 565 |
| Ti$_{45}$Zr$_{16}$Ni$_9$Cu$_{10}$Be$_{20}$ | 118 | 96.2 | 530 |
| Ti$_{40}$Zr$_{25}$Be$_{30}$Cr$_5$ | 151 | 99.6 | 486 |

Figure 12:
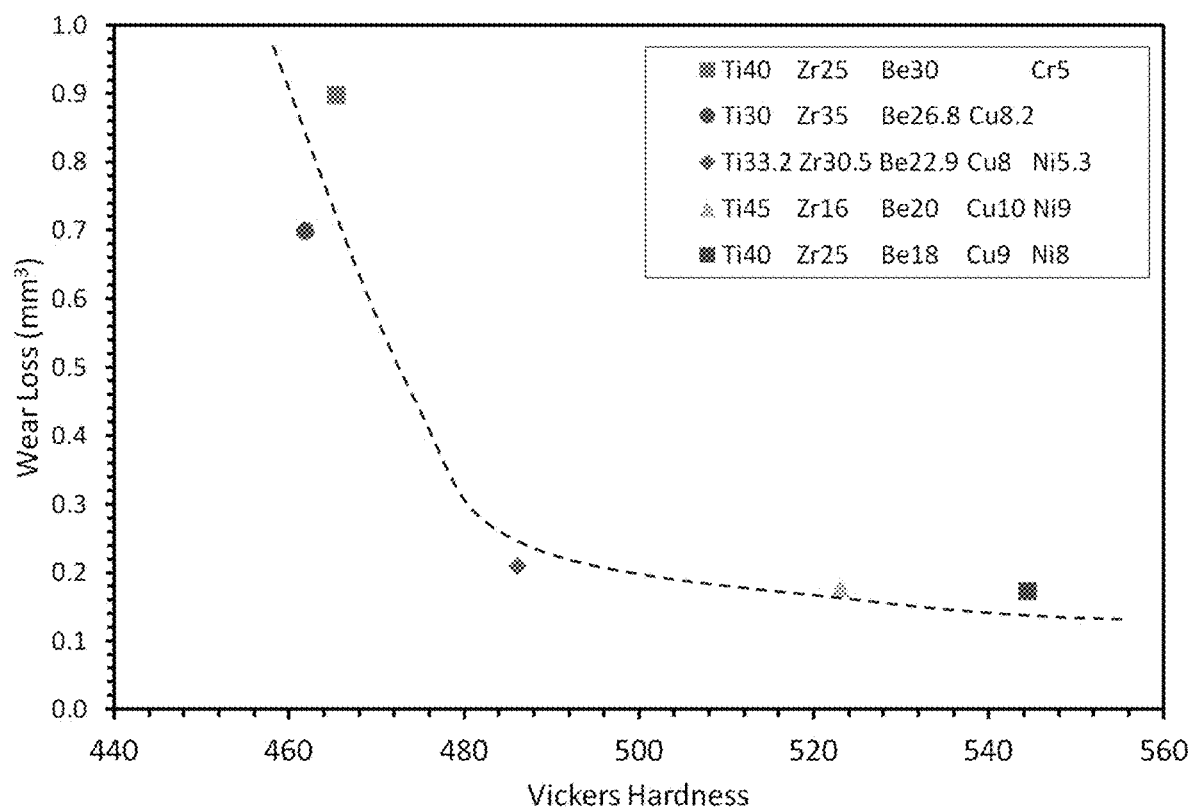
FIG. 12 depicts the wear characteristics for various compositions of a TiZrBe BMG alloy system.

Additionally, FIG. 12 depicts of a plot of these results. Specifically, FIG. 12 plots the wear loss as a function of hardness.

Importantly, these wear characteristics, e.g., wear loss, hardness, and fracture toughness, can be controlled through composition changes. The following general guidelines are provided:
the alloys become more brittle as the Ti % increases;
Increasing the Zr relative to the Ti increases the toughness and the galling wear loss;
Thus, with respect to toughness:
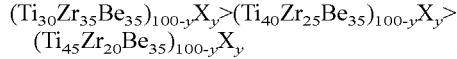
(Ti$_{30}$Zr$_{35}$Be$_{35}$)$_{100-y}$X$_y$>(Ti$_{40}$Zr$_{25}$Be$_{35}$)$_{100-y}$X$_y$>(Ti$_{45}$Zr$_{20}$Be$_{35}$)$_{100-y}$X$_y$ Adding Cu increases the toughness compared to TiZrBe, but adding Ni, Fe, Al, Co, and Cr tend to decrease toughness;
Thus, with respect to toughness:
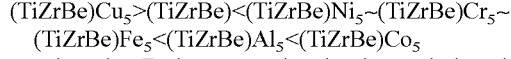
(TiZrBe)Cu$_5$>(TiZrBe)<(TiZrBe)Ni$_5$~(TiZrBe)Cr$_5$~(TiZrBe)Fe$_5$<(TiZrBe)Al$_5$<(TiZrBe)Co$_5$ Increasing the Zr increases the density and the glass forming ability;
Thus, with respect to glass forming ability:
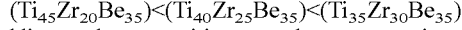
(Ti$_{45}$Zr$_{20}$Be$_{35}$)<(Ti$_{40}$Zr$_{25}$Be$_{35}$)<(Ti$_{35}$Zr$_{30}$Be$_{35}$)

Adding a late transition metal to any ratio of Zr:Ti increases the glass forming ability. Adding more than ~10% Fe, Cr, Co, or Al actually decreases the glass forming. However, adding approximately 1:1 Cu to Ni increases glass forming up to about 20% of both. Adding Cu and Ni in quantities greater than 10% by themselves, improves glass forming.
Thus, with respect to glass forming ability:
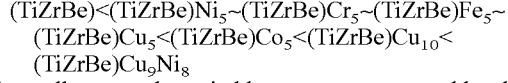
(TiZrBe)<(TiZrBe)Ni$_5$~(TiZrBe)Cr$_5$~(TiZrBe)Fe$_5$~(TiZrBe)Cu$_5$<(TiZrBe)Co$_5$<(TiZrBe)Cu$_{10}$<(TiZrBe)Cu$_9$Ni$_8$ Generally, to make suitable gears, you can add a late transition metal to a TiZrBe alloy, and then modify the ratio of Ti:Zr and the quantity and type of the added late transition metal(s) to increase or lower the toughness, which either improves or decreases wear performance.

Of course, there exist many alloy systems that can be implemented in accordance with embodiments of the invention. And they may be tweaked to obtain the desired wear performance. The above description of the TiZrBe was not meant to be limiting in any way, and was provided merely to give an example as to how an alloy system may be modified to obtain desired wear characteristics.

Figure 13:
FIG. 13 illustrates gears that have been fabricated in accordance with embodiments of the invention.

FIG. 13 illustrates TiZrBeCu BMG-based macroscale gears that were fabricated in accordance with embodiments of the invention. For purposes of scale, the housing 1310 is approximately two inches in length. This image is an exploded view of the gears when removed from the housing and the ceramic shafts that the gears spin on while in the gearbox.

Below, it is discussed how low temperature applications for BMG-based macroscale gears present unique material selection considerations.

Low Temperature Applications for BMG-Based Macroscale Gears

Figure 14A:
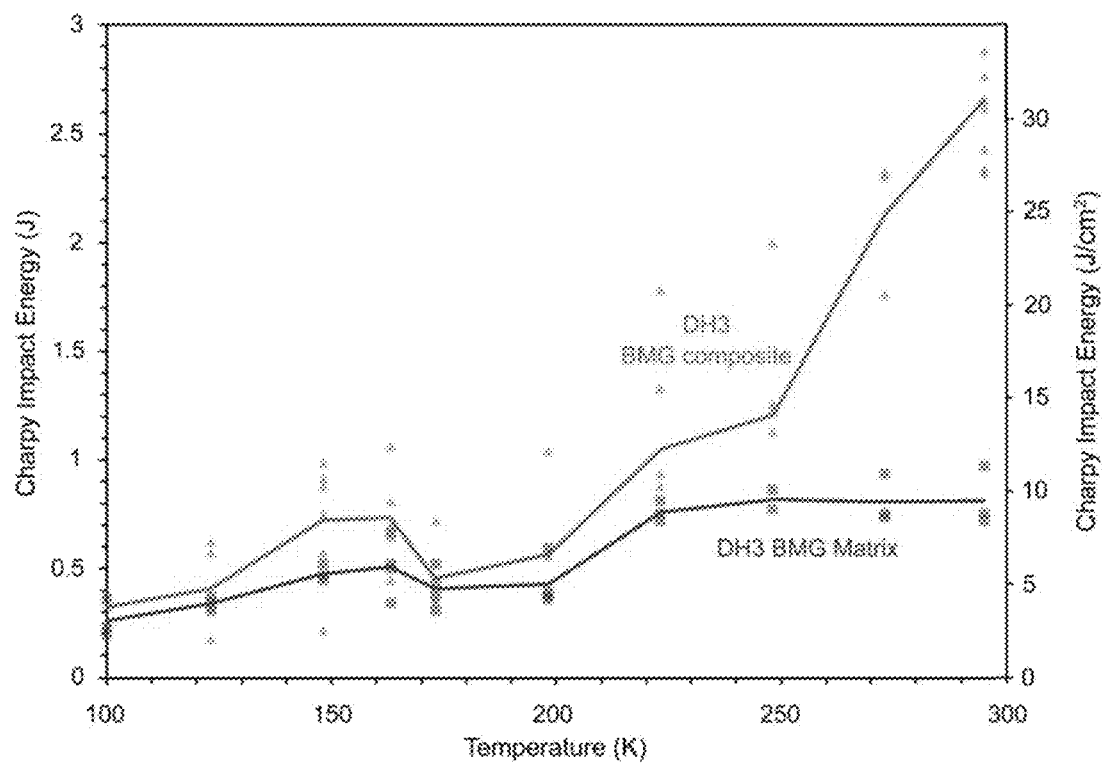
FIGS. 14A and 14B illustrate two plots that depict Charpy impact energy as a function of temperature for a variety of alloy systems.
Figure 14B:
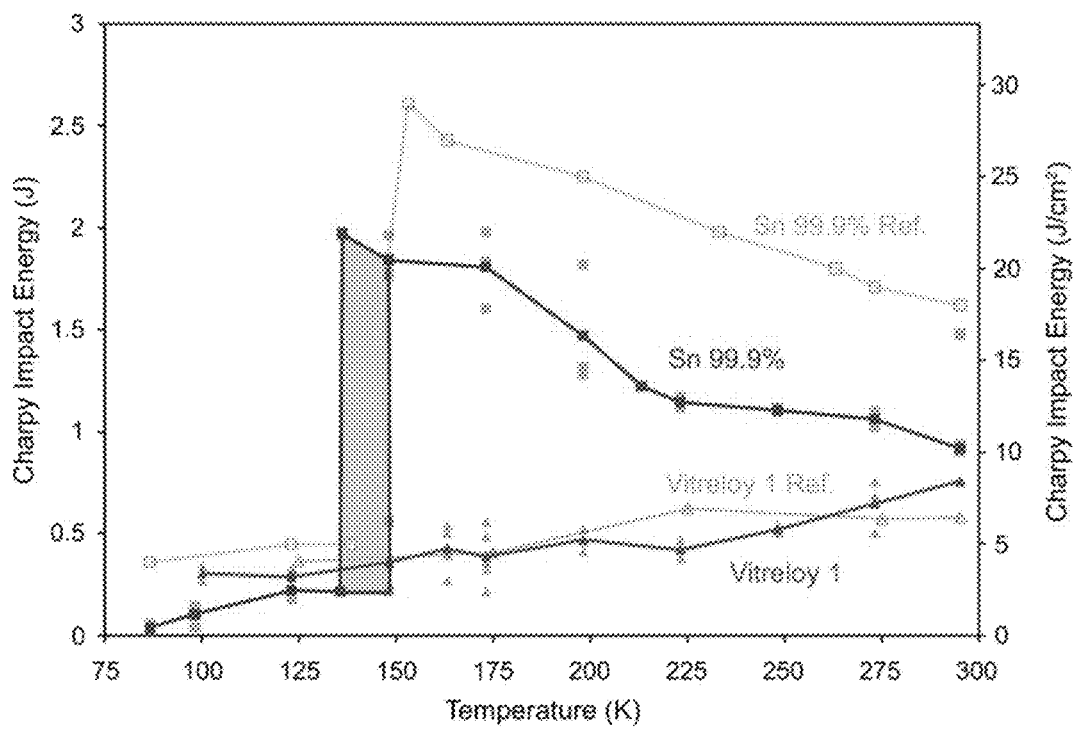

BMG-based macroscale gears may sometimes be required to function at low temperatures (e.g., below 0° C.), and the dependence of BMG material properties on temperature must be accounted for in selecting a material from which such gears will be based. For example, the resistance to brittle failure of BMG materials tends to linearly decrease with temperature. FIG. 14A illustrates how a BMG, DH3 BMG Matrix, along with a corresponding composite, DH3 composite, have Charpy impact energies (which are indicative of resistance to brittle failure, or alternatively how brittle a material is) that decrease approximately linearly as a function of temperature. Notably, FIG. 14B illustrates that whereas BMGs (e.g., Vitreloy, a ZrTiCuNiBe BMG) tend to linearly become more brittle at lower temperatures, many crystalline metals (e.g., Tin and especially bcc and bct metals) tend to demonstrate a well-defined ductile-to-brittle transition temperature.

Figure 15:
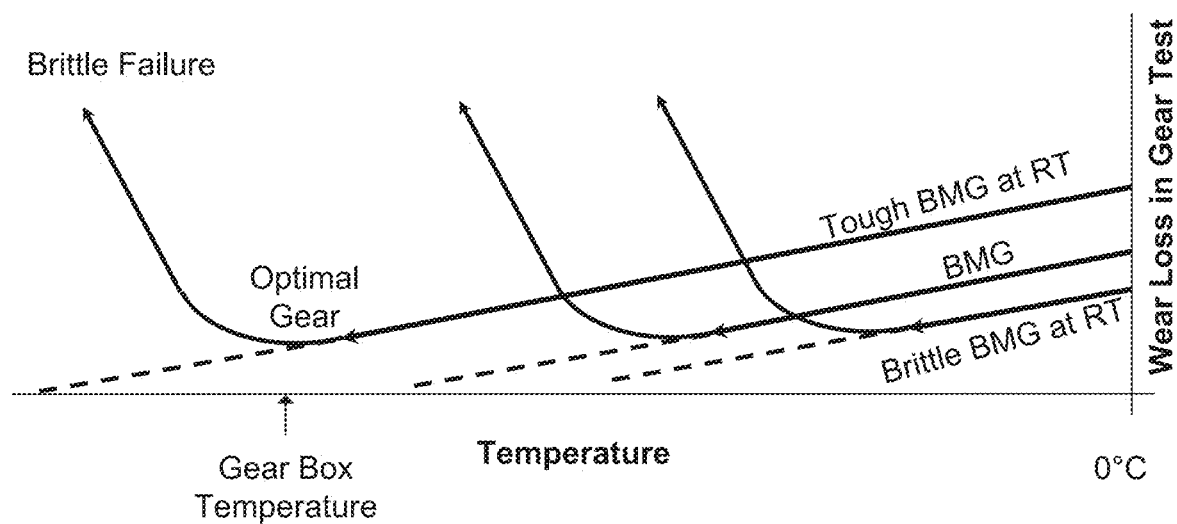
FIG. 15 illustrates design principles that can be used in fabricating BMG-based macroscale gears that are configured to operate at low temperature in accordance with embodiments of the invention.

FIG. 15 illustrates a plot that conveys design considerations when selecting a material for BMG-based macroscale gear low temperature operation. Specifically, the plot illustrates the expected wear loss for three BMG materials as a function of temperature: a BMG material that is tough at room temperature, a BMG material that is brittle at room temperature, and a BMG material that is somewhere in between at room temperature. Each of the three materials becomes excessively brittle at a certain temperature, such that brittle fracture is expected if they were to be implemented in macroscale gears below that critical temperature. The inventors have observed that many BMGs tend to have a similar linear relationship characterizing their brittle nature as a function of temperature. In other words, many BMGs become more brittle by the same extent for any given reduction in temperature. Thus, in the illustration the slopes of the respective lines characterizing wear loss as a function of temperature seen in FIG. 15 are parallel prior to brittle fracture. The inventors have particularly observed that many BMGs decrease in Charpy impact energy in accordance with 0.02 J/° C. Hence, a material that is not tough enough at room temperature, such that it experiences excessive abrasive wear and galling at room temperature and therefore is not a good material selection for a macroscale gear that will operate at room temperature, may actually be a preferable material for a gear that operates at a low temperature. Conversely, BMG materials that may be optimal for room temperature operation may not be suitable for low temperature operation, because at low temperature operation, they become excessively brittle.

Accordingly, in many embodiments of the invention, these design principles are utilized in the material selection process for a BMG-based macroscale gear. In some embodiments, in selecting a material for low temperature gear operation, the required resistance to brittle fracture at the low temperature is obtained (e.g., based on anticipated torque, life time, contact stress, etc.), and a BMG material is selected based on the required resistance to brittle fracture at the low temperature. For example, if the required resistance to brittle fracture at low temperature is known as a function of Charpy impact energy, then the general relationship of 0.02 J/° C. may be used to compute what the room temperature resistance to brittle fracture of the BMG should be, and based on this information, a BMG material can be selected. Of course, it is to be understood that the general relationship 0.02 J/° C. does not have to be used. For example, a more precise relationship of Charpy impact energy as a function of temperature can be determined through experimentation and used to compute the desired BMG's room temperature Charpy impact energy in accordance with embodiments of the invention; accordingly, a BMG material can be selected based on this information.

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A method of fabricating a bulk metallic glass-based macroscale gear, comprising:
   identifying an alloy system with a fracture toughness of between 20 MPa*m$^{1/2}$ and 100 MPa*m$^{1/2}$;
   micro-alloying the alloy system to achieve a hardness of at least 400 Vickers, while maintaining the fracture toughness of between 20 MPa*m$^{1/2}$ and 80 MPa*m$^{1/2}$, and a glass forming ability of 4 mm;
   selecting a bulk metallic glass forming alloy from the micro-alloyed alloying system, wherein the bulk metallic glass forming alloy is characterized by a set of criteria comprising: a hardness of 450 to 565 Vickers, a fracture toughness of between 20 and 80 MPa*m$^{1/2}$, a glass forming ability of at least 4 mm, and a plastic zone radius; and
   fabricating the bulk metallic glass-based macroscale gear free of crystalline phase from the selected bulk metallic glass forming alloy, the gear having a plurality of gear teeth and characterized by a shape and a plurality of dimensions, wherein at least one dimension of the plurality of dimensions is larger than the plastic zone radius.

2. The method of claim 1, wherein the hardness is between 500 and 565 Vickers.

3. The method of claim 1, wherein the at least one dimension of the gear is selected from the group consisting of: a thickness, and a diameter.

4. The method of claim 3, wherein the at least one dimension of the gear is the thickness, and the thickness is greater than 3 mm.

5. The method of claim 3, wherein the at least one dimension of the gear is the diameter, and the diameter is greater than 5 mm.

6. The method of claim 1, wherein the fracture toughness is between approximately 40 MPa*m$^{1/2}$ and 80 MPa*m$^{1/2}$.

7. The method of claim 1, wherein the hardness is at least 550 Vickers.

8. The method of claim 1, wherein the hardness is between 500 and 565 Vickers, and the fracture toughness is between 40 MPa*m$^{1/2}$ and 80 MPa*m$^{1/2}$.

9. The method of claim 1, wherein the bulk metallic glass forming alloy is further characterized by one or more properties selected from the group consisting of: a wear volume loss of less than 2 mm$^3$ as determined in an ASTM pin-on-disk test setup that uses a steel wear ball 100 g weight, 1.2 km of total wear track, run at 200 rpm; Young's Modulus of between 90 and 115 GPa; density of between 4.5 and 6 g/cm$^3$, and any combination thereof.

10. The method of claim 1, wherein the bulk metallic glass forming alloy is an alloy based on an element selected from the group consisting of: Zr, Ti, Cu, Pd, and Pt.

11. The method of claim 10, wherein the bulk metallic glass forming alloy is a TiZrBeX alloy, and further wherein X is one or more late transition metal element.

12. The method of claim 11, wherein:
   Ti is between approximately 30 and 60 atomic % of the TiZrBeX alloy;
   Zr is between approximately 15 and 35 atomic % of the TiZrBeX alloy;
   Be is between approximately 7 and 35 atomic % of the TiZrBeX alloy; and
   all other constituent elements of the TiZrBeX alloy comprise less than approximately 20 atomic %.

13. The method of claim 1, wherein the gear is configured to operate at a temperature distinct from room or near room temperature, and providing the bulk metallic glass forming alloy further comprises adjusting the set of criteria such that the fracture toughness is compensated for temperature dependent changes to optimize operating of the gear at the temperature.

14. The method of claim 13, wherein the temperature is below 0° C., and providing the bulk metallic glass forming alloy further comprises adjusting the set of criteria such that the fracture toughness is extrapolated using a relationship of Charpy impact energy as a function of temperature.

15. The method of claim 14, wherein extrapolating comprises correlating a desired threshold Charpy impact energy at the temperature with a threshold Charpy impact energy at room temperature using the relationship of Charpy impact energy as a function of temperature.

16. The method of claim 15, wherein the relationship of Charpy impact energy as a function of temperature is linear.

17. The method of claim 16, wherein the relationship of Charpy impact energy as a function of temperature is 0.02 J/° C.

18. The method of claim 1, further comprising depositing a coating over at least a portion of the plurality of gear teeth, wherein the coating is a hard and/or wear-resistant coating.

19. The method of claim 18, wherein the coating is a molybdenum-based alloy.

20. The method of claim 19, wherein the coating is MoS$_2$.

* * * * *